(12) United States Patent
Beland et al.

(10) Patent No.: US 8,710,765 B2
(45) Date of Patent: Apr. 29, 2014

(54) LED ILLUMINATION SYSTEMS

(76) Inventors: Robert Beland, St. Marthe sur le Lac (CA); Giampaolo Carli, Saint-Lazare (CA)

( * ) Notice: Subject to any disclaimer, the term of this patent is extended or adjusted under 35 U.S.C. 154(b) by 178 days.

(21) Appl. No.: 13/068,411

(22) Filed: May 9, 2011

(65) Prior Publication Data

US 2011/0309760 A1 Dec. 22, 2011

Related U.S. Application Data

(60) Provisional application No. 61/395,200, filed on May 8, 2010.

(51) Int. Cl.
*H05B 37/02* (2006.01)
(52) U.S. Cl.
USPC .......................................... 315/297; 315/307
(58) Field of Classification Search
USPC .................... 315/291, 294, 297, 307
See application file for complete search history.

(56) References Cited

U.S. PATENT DOCUMENTS

| | | | |
|---|---|---|---|
| 3,708,739 A | 1/1973 | Kohler | 363/57 |
| 3,889,252 A | 6/1975 | Cox, III et al. | 340/313 |
| 4,132,925 A | 1/1979 | Schmutzer et al. | 315/208 |
| 4,259,616 A | 3/1981 | Smith | 315/256 |
| 4,641,061 A | 2/1987 | Munson | 315/210 |
| 4,751,398 A | 6/1988 | Ertz, III | 307/66 |
| 4,797,801 A | 1/1989 | Furuhashi | 363/43 |
| 4,802,079 A | 1/1989 | Mizoguchi | 363/71 |
| 4,904,904 A | 2/1990 | Zarate | 315/219 |
| 4,967,333 A | 10/1990 | Callier et al. | 363/17 |
| 5,023,769 A | 6/1991 | Beland | 363/86 |
| 5,056,125 A | 10/1991 | Beland | 378/101 |
| 5,241,260 A | 8/1993 | Beland | 323/270 |
| 5,388,139 A | 2/1995 | Beland | 378/112 |
| 5,391,977 A | 2/1995 | Beland | 323/268 |
| 5,416,388 A | 5/1995 | Shackle | 315/219 |
| 5,495,165 A | 2/1996 | Beland | 323/270 |
| 5,559,686 A | 9/1996 | Patel et al. | 363/43 |
| 5,566,443 A | 10/1996 | Allan et al. | 29/605 |
| 5,594,433 A | 1/1997 | Terlep | 340/908.1 |
| 5,621,281 A | 4/1997 | Kawabata et al. | 315/311 |
| 5,661,774 A | 8/1997 | Gordon et al. | 378/101 |
| 5,734,562 A * | 3/1998 | Redl | 363/16 |

(Continued)

FOREIGN PATENT DOCUMENTS

JP 57101440 6/1982

OTHER PUBLICATIONS

European Search Report issued in European Application EP 11003783 on Jul. 18, 2011 (3 pages).

(Continued)

*Primary Examiner* — Jason M Crawford
(74) *Attorney, Agent, or Firm* — Ivan David Zitkovsky

(57) ABSTRACT

An illumination system includes a power supply having a boost converter operating in the discontinuous conduction mode, a flyback converter operating in the critical conduction mode, and a switch coupled to the flyback converter. Several light emitting diodes receive power from the power supply. The boost converter may include a boost inductor ($L_B$) and a boost diode ($D_B$), constructed to perform the boost power factor correction (PFC) function. The flyback converter may includes a flyback inductor ($L_{FB}$) and a flyback diode ($D_{FB}$) and the power supply may be constructed to turn on the switch around the point where the current flowing in the flyback inductor reaches zero value.

30 Claims, 25 Drawing Sheets

(56) References Cited

U.S. PATENT DOCUMENTS

| | | | |
|---|---|---|---|
| 5,814,938 A | 9/1998 | Beland et al. | 315/3 |
| 5,966,425 A | 10/1999 | Beland | 378/108 |
| 5,991,172 A | 11/1999 | Jovanovic et al. | 363/21 |
| 6,005,781 A * | 12/1999 | Balakirshnan | 363/21.18 |
| 6,111,367 A | 8/2000 | Asano et al. | 315/291 |
| 6,111,732 A | 8/2000 | Beland | 361/42 |
| 6,118,227 A | 9/2000 | Beland | 315/276 |
| 6,144,170 A | 11/2000 | Beland et al. | 315/276 |
| 6,344,986 B1 * | 2/2002 | Jain et al. | 363/89 |
| 6,351,079 B1 | 2/2002 | Willis | 315/200 A |
| 6,424,098 B1 | 7/2002 | Beland et al. | 315/224 |
| 6,538,394 B2 | 3/2003 | Volk et al. | 315/291 |
| 6,578,986 B2 | 6/2003 | Swaris et al. | 362/249 |
| 6,618,031 B1 | 9/2003 | Bohn, Jr. et al. | 345/83 |
| 6,693,556 B1 | 2/2004 | Jones et al. | 340/907 |
| 6,712,486 B1 | 3/2004 | Popovich et al. | 362/249 |
| 6,846,093 B2 | 1/2005 | Swaris et al. | 362/249 |
| 6,956,494 B2 | 10/2005 | Tichborne et al. | 340/815.45 |
| 6,967,851 B2 * | 11/2005 | Yang et al. | 363/16 |
| 7,012,818 B2 * | 3/2006 | Kotsuji et al. | 363/21.01 |
| 7,324,354 B2 * | 1/2008 | Joshi et al. | 363/17 |
| 7,385,833 B2 | 6/2008 | Keung | 363/56.12 |
| 7,486,030 B1 | 2/2009 | Biggs | 315/247 |
| 7,535,734 B2 * | 5/2009 | Li et al. | 363/21.01 |
| 7,616,459 B2 | 11/2009 | Huynh et al. | 363/21.12 |
| 8,076,920 B1 * | 12/2011 | Melanson | 323/299 |
| 2007/0236159 A1 * | 10/2007 | Beland | 315/312 |
| 2008/0088248 A1 | 4/2008 | Myers | 315/210 |
| 2008/0224625 A1 * | 9/2008 | Greenfeld | 315/201 |
| 2008/0285271 A1 * | 11/2008 | Roberge et al. | 362/235 |
| 2009/0091268 A1 | 4/2009 | Forssen | 315/250 |
| 2009/0295300 A1 | 12/2009 | King | 315/209 |
| 2010/0213859 A1 * | 8/2010 | Shteynberg et al. | 315/224 |

OTHER PUBLICATIONS

European Search Report issued in European Application EP 11003783 on Apr. 3, 2012 (3 pages).

Quadrand & BiMod LED Lighting Systems, ACTOWN, Sign Products Group Spring Grove, IL 60081 www.actown.com.

"LED Modules link together for signs and displays" LEDTRONICS Inc. www.ledtronics.com Jul. 20, 2005.

"Quadrand & BiMod LED Lighting Systems," Actown, Sign Products Group Spring Grove, IL 60081 www.actowm.com Mar. 2004 (4 pages).

"ChannelED 4 Great White" SloanLED, Ventura, CA 93003 www.SloanLED.com (7 pages) Mar. 25, 2004.

"ChannelED 4 Channel Letter" LEDs SloanLED, Ventura, CA 93003 www.SloanLED.com Jul. 15, 2005 (2 pages).

TETRA BT LED Border Tube Systems, GELcore Valley View, OH 44125 www.gelcore.com 2006.

TETRA LED Systems, "LED Illuminations for Signage and Architecture," GELcore Valley View, OH 44125 www.gelcore.com 2006 (3 pages).

* cited by examiner

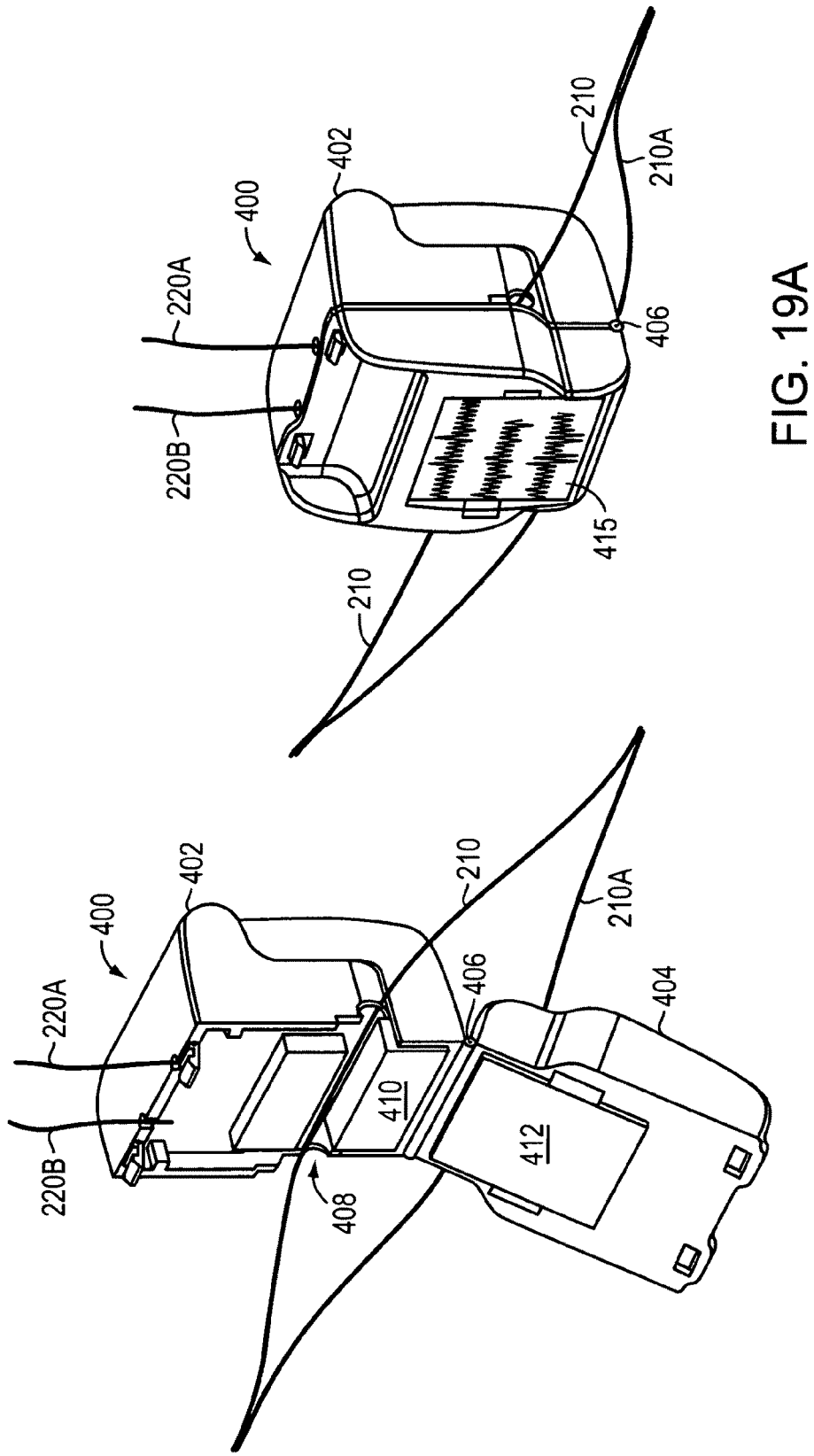

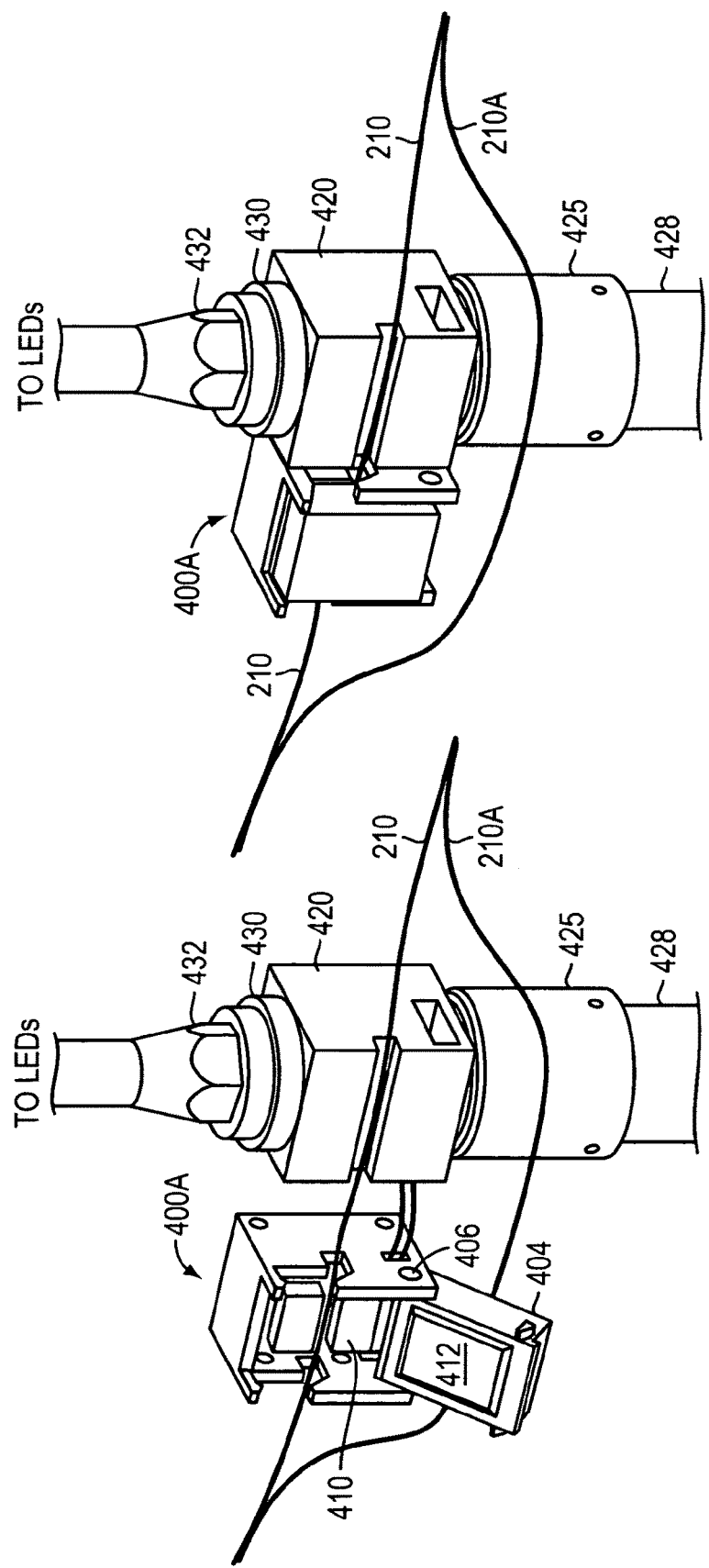

LED ILLUMINATION SYSTEMS

This application claims priority to U.S. Application 61/395,200, filed on May 8, 2010, entitled ILLUMINATION SYSTEMS, which is incorporated by reference.

BACKGROUND OF THE INVENTION

The present invention relates to illumination systems and methods using light emitting diodes (LEDs), and more particularly relates to illumination systems and methods using novel power supplies, controllers, and LED modules.

Commercial lighting systems, used on the outside of commercial buildings for advertising purposes, include channel letters. Channel letters generally include a housing with a concave cross-section about 5" deep, made of aluminum or plastic. The housing cavity, shaped as the letter, is covered by a translucent plastic sheet of a selected color, illuminated by a light source mounted within. Neon and fluorescent lights provide suitable illumination, allowing the letters to shine brightly when turned on. However, fluorescent light sources have a relatively short life of approximately 20,000 hours. They operate at high voltage (for example, 7,000 to 15,000 volts for neon) and can consume a relatively large amount of electrical power. Furthermore, fluorescent light tubes are usually quite fragile. Still, fluorescent lights have been used for decades and decades in different fields.

Light emitting diodes (LEDs) are currently used for a wide range of applications, providing a variety of advantages relative to conventional lights, such as neon or fluorescent bulbs, due to their advantageous qualities. LEDs are compact, rugged, and consume less power, being 30 to 70% more energy efficient than conventional lights. LEDs have a relatively long life of up to 100,000 hours and operate at low voltages (4 VDC to 24 VDC).

LED illuminating system generally used in commercial, architectural, home or landscaping applications usually include a DC power supply usually connected to 110 VAC (220 VAC). The output from the power supply provides DC voltage (usually from 4 VDC to 24 VDC) to a supply rail, wire, or connectors providing electrical connection to LED arrays arranged in several illumination modules also including ballast resistors. These modules are usually connected in parallel on a DC supply bus. The LEDs are connected with wires that are soldered permanently at a fixed spacing, or using electrical connectors providing use fixed electrical contact; that is, use fixed electrical wiring. Every single illumination module is connected to the next module using two or four wires (i.e., positive and negative inputs and outputs) by mechanically creating electrical contact. Each LED module uses a ballast resistor (or regulator) to provide a constant current to the LEDs connected in series since LEDs operate with current (and not voltage). The modules are usually located inside a letter channel. This dissipative method normally uses as much energy in the ballast resistor (i.e., dissipated energy) as in the LEDs, resulting in efficiencies sometimes even lower than 50%. This means there is frequently a significant amount of energy wasted in heat.

The brightness of an LED depends upon the amount of electrical current flowing through the diode. However, while an increase in current increases the brightness of the light emitted by the LED, it also increases the connection temperature, which can decrease the LED's efficiency and life. Given that LEDs are often constructed of semiconductor materials that share many comparable properties with silicone and gallium arsenide, this can be highly detrimental.

The conventional light circuits can be prone to problems other than those described above. The LED modules joined physically using fixed electrical contact connectors, which are prone to reliability troubles. For example, connectors can fail due to corrosion, and many devices, as well as commercial lighting systems, are used outdoors. Also, while diodes are generally biased through a series resistor from a regulated voltage supply, the amount of current going through the diode depends also on the forward voltage drop over the diode, which drops with changes in its size, age, and its temperature at the time.

The LEDs have been also used as light sources in applications such as emergency EXIT signs. The EXIT signs contain a reflector in the rear, having a series of curved, concave surfaces shaped as letters and background area. The LEDs are mounted in the center of each surface to provide light that is projected outwardly. The LEDs have been used for illumination and in architectural and gardening designs where the robustness of the illumination system and life of the illumination system is very important since repair or replacement requires significant cost of labor (even sometimes surpassing the cost of the LED system).

There is still a need for an improved illumination system that is simple and quick to install and that operates at relatively high power efficiency.

SUMMARY OF THE INVENTION

The present invention relates to LED illumination systems and methods using novel converter power supplies, controllers, and/or LED modules.

According to one aspect, an illumination system includes a power supply having a boost converter operating in the discontinuous conduction mode, a flyback converter operating in the critical conduction mode, and a switch coupled to the flyback converter. Several light emitting diodes receive power from the power supply.

Preferred embodiments of this aspect include one or several of the following features: The boost converter includes a boost inductor ($L_B$) and a boost diode ($D_B$) and is constructed to perform the boost power factor correction (PFC) function. The flyback converter includes a flyback inductor ($L_{FB}$) and a flyback diode ($D_{FB}$) and the power supply is constructed to turn on the switch as the current flowing in the flyback inductor reaches zero value. Alternatively, the output from the flyback converter may be constructed to turn on the switch before or after the point where the current flowing in the flyback inductor reaches zero value.

The output of the flyback converter is used for regulating the power supply. The flyback converter includes a capacitor operating in open loop and thus the power supply is controlled without receiving a feedback from the capacitor of the flyback converter. All capacitors used in the power supply are non-electrolytic capacitors.

The flyback converter provides an output being regulated by a feedback loop. The flyback converter is regulated by a voltage feedback. The flyback converter is regulated by a current feedback. The flyback converter is regulated by the feedback loop and an error signal sets a peak current of the flyback inductor ($L_{FB}$) that automatically also determines a current flowing in the boost inductor ($L_B$).

The flyback converter includes a flyback inductor ($L_{FB}$), a switch (Q), and flyback diode ($D_{FB}$) providing flyback-based output regulation and isolation.

The output from the flyback converter is coupled to an output rectifier and a filter providing an LED current to the several light emitting diodes. The LED current is similar to an ideal current source.

The illumination system includes an illumination module including an electromagnetic coupling element and the several light emitting diodes, wherein the electromagnetic coupling element includes a magnetic core arranged to receive output current from the power supply over a current-carrying loop forming a primary wire. A secondary wire is wound with respect to at least a portion of the magnetic core to enable inductive coupling from the primary wire, and provide a current to the several light emitting diodes.

The illumination system may include a second illumination module including an electromagnetic coupling element and the several light emitting diodes, wherein the electromagnetic coupling element includes a magnetic core arranged to receive output current from the power supply over a current-carrying loop forming a primary wire. A secondary wire is wound with respect to at least a portion of the magnetic core to enable inductive coupling from the primary wire, and provide a current to the several light emitting diodes.

The magnetic core and a part of the secondary wire wound around the core are encapsulated, thereby sealing the core and wire portion while enabling displacement of the primary wire with respect to the encapsulated magnetic core. The magnetic core may be ring-shaped and the secondary wire is wound around at least a portion of the ring-shaped core. The primary wire is threaded through an opening in the ring-shaped core.

The magnetic core may have a rectangular shape, and the secondary wire is wound around at least a portion of the rectangularly-shaped core. The primary wire is threaded through an opening in the rectangularly-shaped core.

According to another aspect, an illumination system includes a master power supply including a boost converter and a flyback converter, and an illumination module. The master power supply is constructed and arranged to generate high-frequency and low-voltage electrical power provided to a primary wire forming a current-carrying loop. The illumination module includes an electromagnetic coupling element and several light emitting diodes, wherein the electromagnetic coupling element includes a magnetic core arranged to receive the current loop, and a secondary wire wound around at least a portion of the magnetic core to enable inductive coupling from the primary wire. The secondary wire is connected to provide current to several light emitting diodes.

Preferred embodiments of this aspect include one or several of the following features:

The magnetic core and a portion of the secondary wire wound around the core are encapsulated thereby sealing the core and the wire portion while enabling displacement of the primary wire with respect to the encapsulated magnetic core. The magnetic core is ring-shaped, and the secondary wire is wound around at least a portion of the ring-shaped core. The primary wire is threaded through an opening in the ring-shaped core.

Alternatively, the magnetic core has a rectangular shape, and the secondary wire is wound around at least a portion of the rectangularly-shaped core. The magnetic core may include at least two parts forming the rectangular shape. The primary wire is placed in the opening of the rectangularly-shaped core by removing one of the parts.

Alternatively, the magnetic core is shaped to include a closed magnetic path, and the secondary wire is wound around at least a portion of the core to provide electromagnetic coupling.

According to yet another aspect, an illumination system includes a master power supply including an AC inverter and an amplitude modulator. The master power supply is constructed and arranged to generate high-frequency current provided to a primary wire forming a current-carrying loop. The amplitude modulator is constructed to amplitude modulate the current ($I_{loop}$) at least two modulation frequencies. The illumination system also includes at least two illumination modules each including several light emitting diodes receiving power by inductive coupling from the current-carrying loop. Each the illumination module includes a frequency discriminator, responsive to one of the modulation frequencies, constructed to enable control of a DC current to the light emitting diodes and thereby control emission of light from the light emitting diodes.

Preferred embodiments of this aspect include one or several of the following features:

The inductive coupling is achieved by an electromagnetic coupling element including a magnetic core arranged to receive the current-carrying loop as a primary wire. A secondary wire is wound around at least a portion of the magnetic core to enable the inductive coupling from the primary wire. The secondary wire is connected to provide current to the light emitting diodes.

The high-frequency current ($I_{loop}$) is in the range of 20 kHz to 100 kHz, and the modulation frequencies are in the range of 1 kHz to 10 kHz. Several modulating signals can be introduced this way using frequency multiplexing.

The illumination module comprises a decoding hardware includes a diode bridge a frequency discriminator, a rectifier, and a comparator providing its output signal to a switch. The switch that acts as an on/off shunt for the light emitting diodes.

The illumination system includes a master power supply that includes a resonant inverter. Preferably, the inverter provides an output in the range of about 20 kHz to about 40 kHz. Preferably, the master power supply includes a self-oscillating inverter providing substantially a sine wave output.

According to yet another aspect, an electromagnetic coupling element is used with an illumination system. The coupling element is constructed to couple inductively power from a power supply to one or multiple light sources. The coupling element includes a magnetic core, a source wire wound around at least a portion of the magnetic core and being connected to at least one light source, and a casing surrounding the magnetic core and the source wire at the portion being wound around the magnetic core to electrically insulate the source wire and the magnetic core. The coupling element also includes an inductive region defined by the magnetic core and arranged to receive a conductor in a removable arrangement with respect to the magnetic core, the conductor being located to couple inductively power from a power supply to the source wire.

According to yet another aspect, a master power supply is designed for an illumination system. The master power supply includes a resonant inverter, and an AC current source. The resonant inverter is constructed and arranged to generate a high-frequency and low-voltage electrical output. The AC current source includes an inductor and provides power to a current-carrying loop.

Preferred embodiments of this aspect include one or several of the following features: Different embodiments of the master power supply, including a resonant inverter, and an AC current source are described in U.S. application Ser. No. 11/786,060, now U.S. Pat. No. 7,928,664, which is incorporated by reference as if fully reproduced herein.

Preferably, the master power supply includes a microcontroller. The master power supply can include a power factor corrector, a pulse width modulation (PWM) line regulator a loop current sensor, or an open circuit voltage sensor.

The illumination system includes at least two illumination modules each including several light emitting diodes receiving power by inductive coupling from the current-carrying loop. Different illumination modules are also described in U.S. Pat. No. 7,928,664 and may be used with the power supplies described here or described in U.S. Pat. No. 7,928,664.

According to yet another aspect, an illumination method includes generating high-frequency and low-voltage electrical power; providing the high-frequency and low-voltage electrical power to a primary wire forming a current loop; coupling energy from the current loop in a contactless manner to a secondary wire; and delivering current from the secondary wire to several light emitting diodes (LEDs).

Preferably, the illumination method includes controlling the high-frequency and low-voltage electrical power, and/or sensing a loop current by monitoring output of the high-frequency and low-voltage electrical signal, and/or sensing an open voltage current.

According to yet another embodiment, in an illumination system, an installation method is used for contactless coupling one or several illumination modules to a power supply. The illumination system comprises a master power supply constructed and arranged to provide electrical power to a primary wire forming a current loop; and an illumination module including an electromagnetic coupling element and several light sources. The electromagnetic coupling element includes a magnetic core. The method includes positioning one or several of the illumination modules constructed to provide light; and positioning the primary wire in a close proximity to the illumination module without establishing an electrical connection, the positioning enabling inductive power transfer from the primary wire to a secondary wire wound around at least a portion of the ferromagnetic core, wherein the secondary wire is connected to provide current to one or multiple LEDs.

According to yet another embodiment, an illumination system may include a master power supply providing power to several illumination modules. The master power supply is constructed and arranged to generate high-frequency and low-voltage electrical power provided to a primary wire forming a current loop. Each illumination module includes an electromagnetic coupling element and several LEDs. The electromagnetic coupling element includes a magnetic core arranged to receive the current loop in a removable arrangement, and a secondary wire wound around the magnetic core to enable inductive coupling. The secondary wire is connected to provide current to the LEDs.

Preferred embodiments of this aspect include one or several of the following features: The magnetic core and a part of the secondary wire wound around the core are encapsulated, thereby sealing the core and wire portion while enabling displacement of the primary wire with respect to the encapsulated ferromagnetic core.

The magnetic core is formed from two or more discrete elements assembled to provide a closed magnetic loop. The secondary wire is preferably wound around a portion of the magnetic core and the construction enables displacement of the primary wire with respect to the ferromagnetic core. The magnetic core may be made of a ferromagnetic material, a ferrite, or a soft ferrite.

The illumination system of this aspect has numerous advantages: There is no need to establish electrical contact or connection to any of the illumination modules, thus increased reliability, lower cost, not position dependent. The system has high efficiency (relatively low power consumption by the elimination of the ballast resistor used for LEDs in prior art systems. There is only one wire used for powering the illumination modules instead of two or four wires in the prior art illuminations systems. Quick and easy installation since there is no polarity because of using alternating current provided by the master power supply. The system can be truly waterproof when the illumination module is encapsulated since there is no connection to the outside world. This provides greater installation safety due to the absence of voltage nearby which prevents accidental contact, and since there is no touchable connection or soldering accessible.

Further features and advantages of the present invention as well as the structure and method of various embodiments of the present invention are described herein in detail below, with reference to the accompanying drawings.

BRIEF DESCRIPTION OF THE DRAWINGS

FIGS. 19 and 19A illustrate a coupling box for use with the illumination systems shown in FIG. 8, 9 or 11.

FIGS. 20, 20A, 20B and 20C illustrate different embodiments of the coupling boxes designed for the illumination systems shown in FIG. 8, 9 or 11.

DETAILED DESCRIPTION OF THE PREFERRED EMBODIMENT

Figure 1:
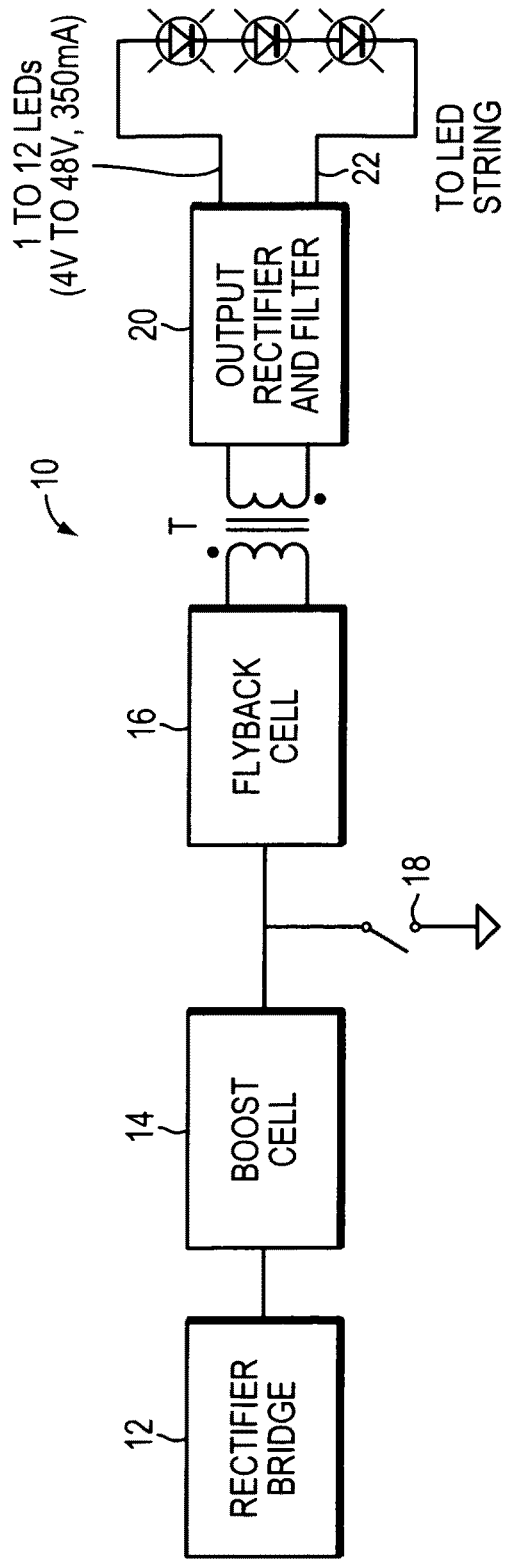
FIG. 1 illustrates diagrammatically a converter power supply for an LED illumination system.

The present invention is directed to LED illumination systems and methods using novel converter power supplies. FIGS. 1, 2, 3 and 3A, illustrate diagrammatically different embodiments of converter power supplies used with LED illumination systems. Converter power supplies 10, 10A, 10B and 10C include a rectifier bridge 12, a boost cell 14 (a boost converter 14), a flyback cell 16 (a flyback converter 16), and an output rectifier and filter 20 connected to a string of light emitting diodes (LEDs). Converter power supply 10A includes, instead of a single rectifier and filter cell 20, a series of resonant converters arranged for open-loop operation 22 and connected to several rectifier and filter cells $24_1$, $24_2$, ..., and $24_N$ coupled by transformers $T_{M1}$, $T_{M2}$, ..., and $T_{MN}$. Each output rectifier and filter cell provides current to a string of LEDs. The rectifier and filter unit together with the string of LEDs may be packaged as an illumination module, described below. Rectifier bridge 12 may be replaced with a DC source.

Figure 2:
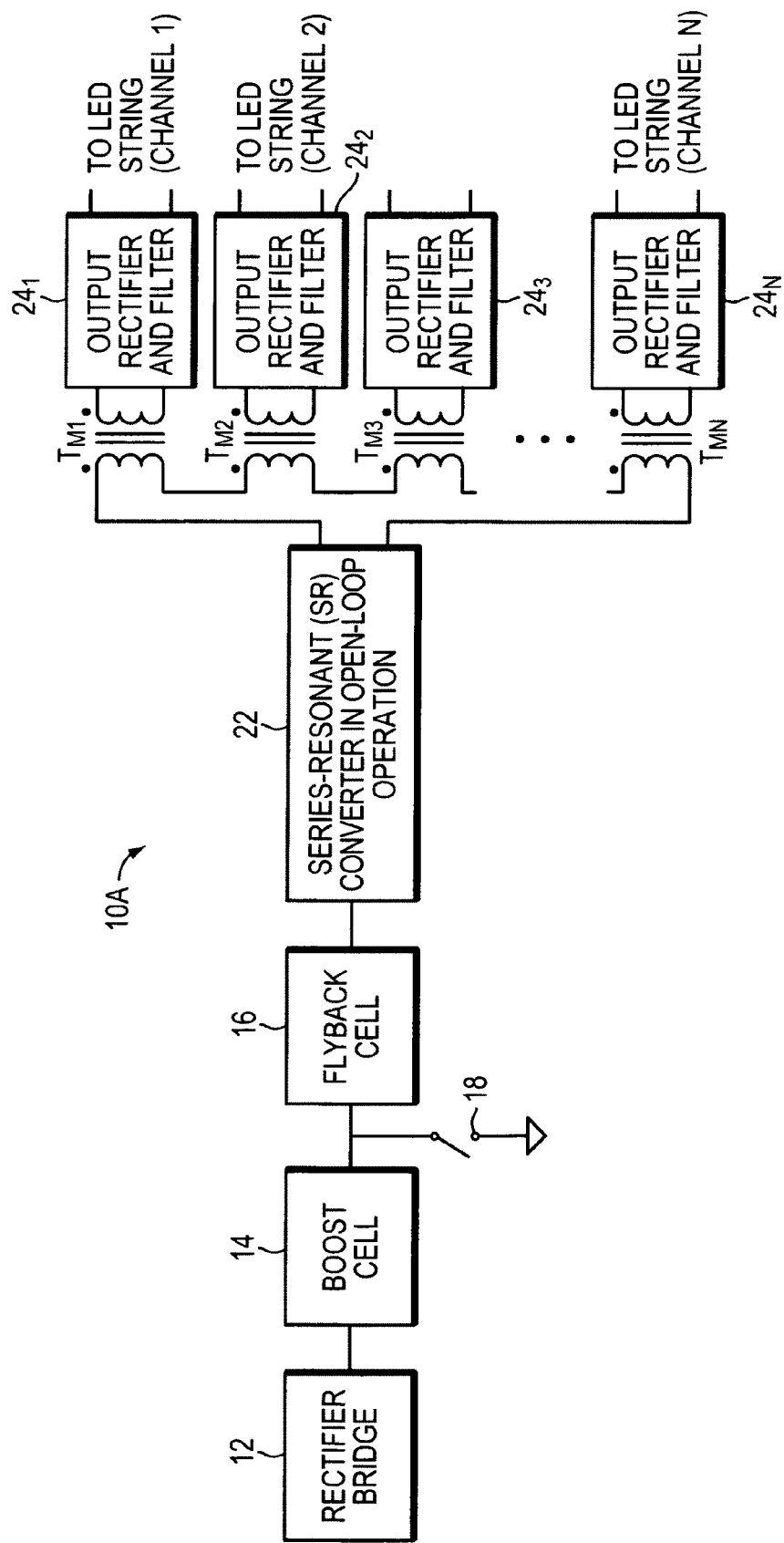
FIG. 2 illustrates diagrammatically another embodiment of a power supply for an LED illumination system.
Figure 3:
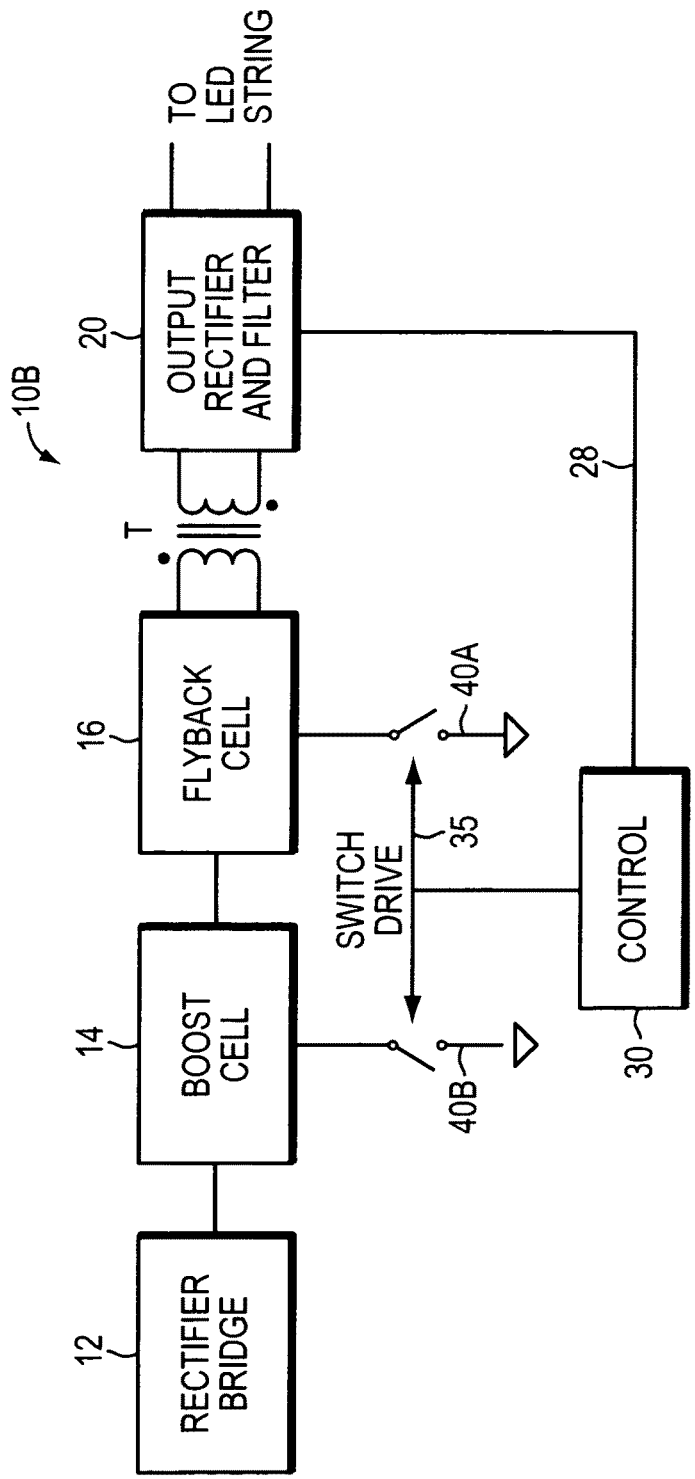
FIG. 3 illustrates diagrammatically another embodiment of a power supply for an LED illumination system.
Figure 3A:
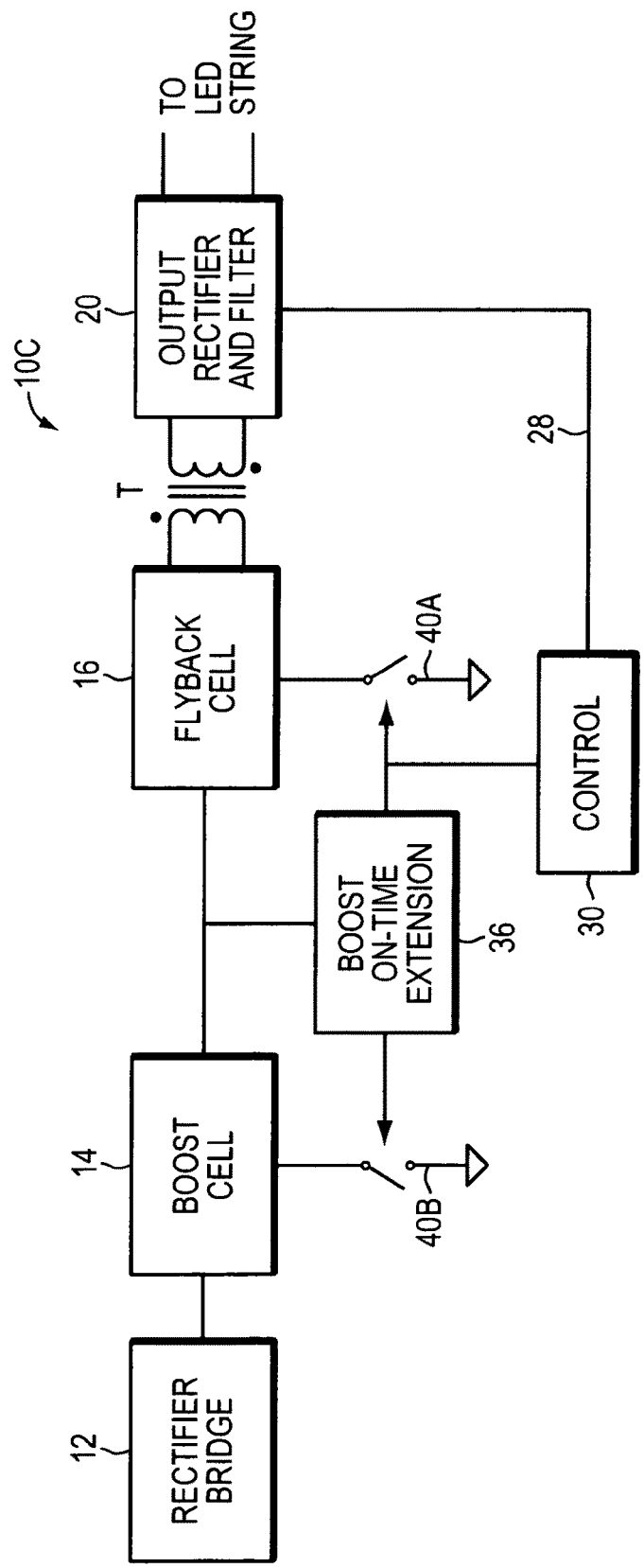
FIG. 3A illustrates diagrammatically another embodiment of a power supply for an LED illumination system.
Figure 4:
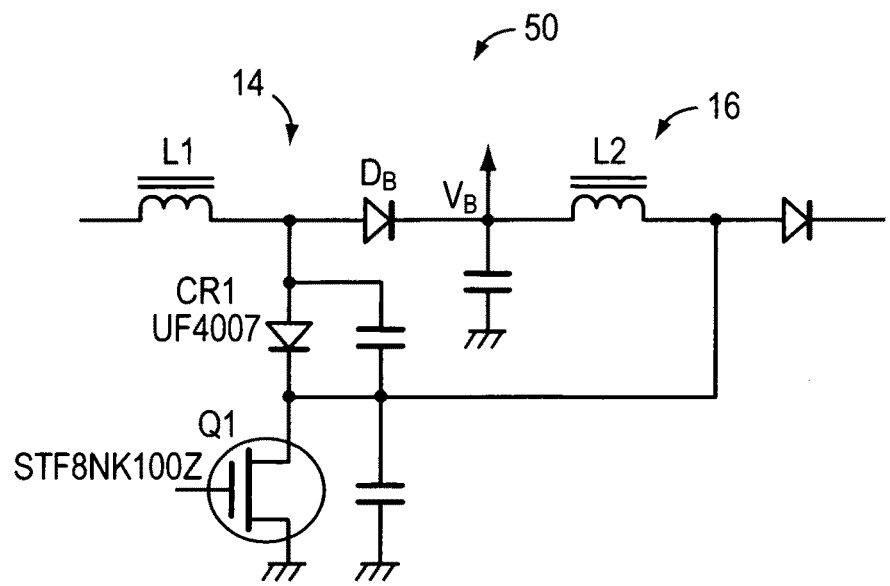
FIG. 4 illustrates a schematic diagram of the converter power supply using a single switch.
Figure 5:
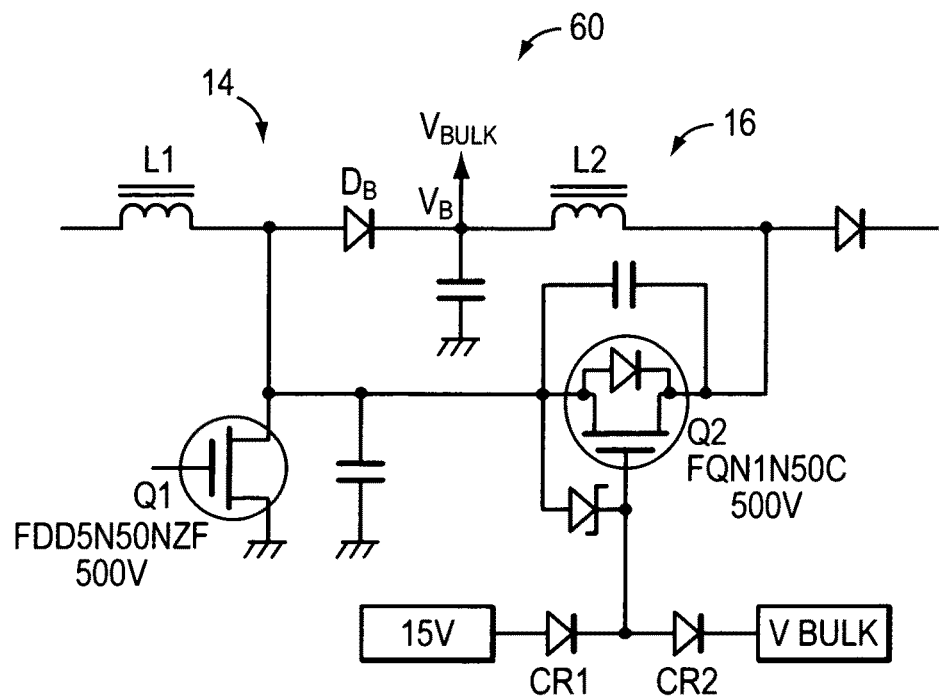
FIG. 5 illustrates a schematic diagram of another of the converter power supply using two switches.

FIG. 4 illustrates a high level schematic diagram of a converter power supply 50 utilizing a single switch as illustrated by a switch 18 in FIGS. 1 and 2. FIG. 5 illustrates a high level schematic diagram of a converter power supply 60 utilizing a dual switch as illustrated by switches 35 and 36 shown in FIGS. 3 and 3A, respectively. The switches are controlled in a feedback arrangement from the output (illustrated as 28) using a controller 30.

Figure 6:
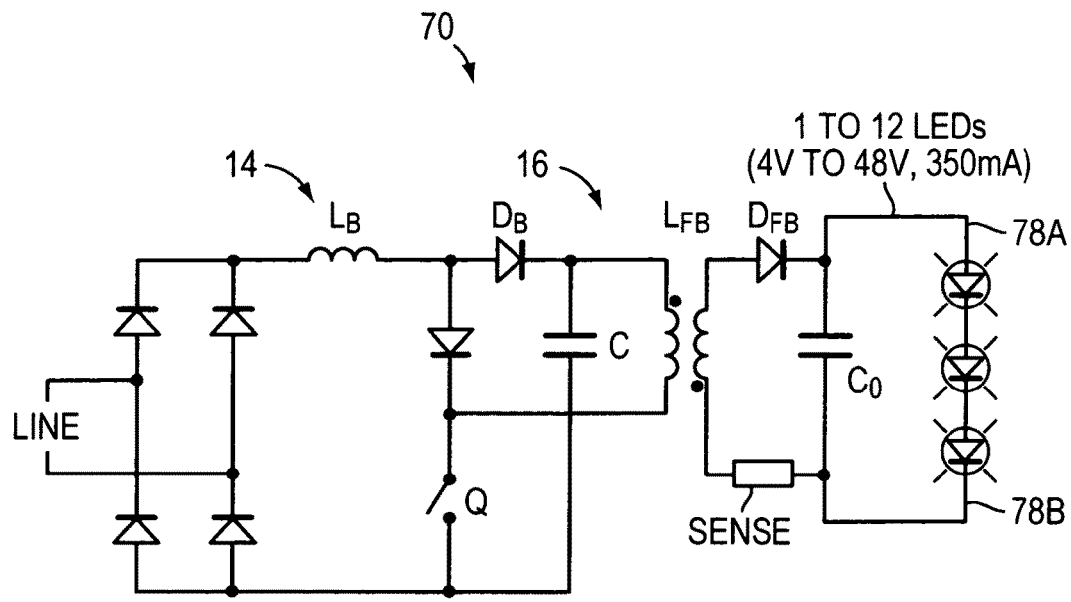
FIG. 6 illustrates another embodiment of the power supply using a single switch for controlling current output to several LEDs.

FIG. 6 illustrates diagrammatically another embodiment of a converter power supply 70 for an LED illumination system. Converter power supply 70 includes the boost cell including $L_B$, Q, $D_B$ and a capacitor C for performing the boost-PFC function. Converter power supply 70 includes the flyback cell including $L_{FB}$, Q, $D_{FB}$ and $C_o$, performing a flyback-based output regulation and isolation function. Converter 70 is controlled by a single loop, where the feedback variable is the average flyback output current. The flyback output current can be sensed by a resistor or, more conveniently, by a current transformer. Appropriate compensation can be added to this loop to either eliminate or attenuate the output ripple current so that both input and output current wave shapes are acceptable.

Figure 7:
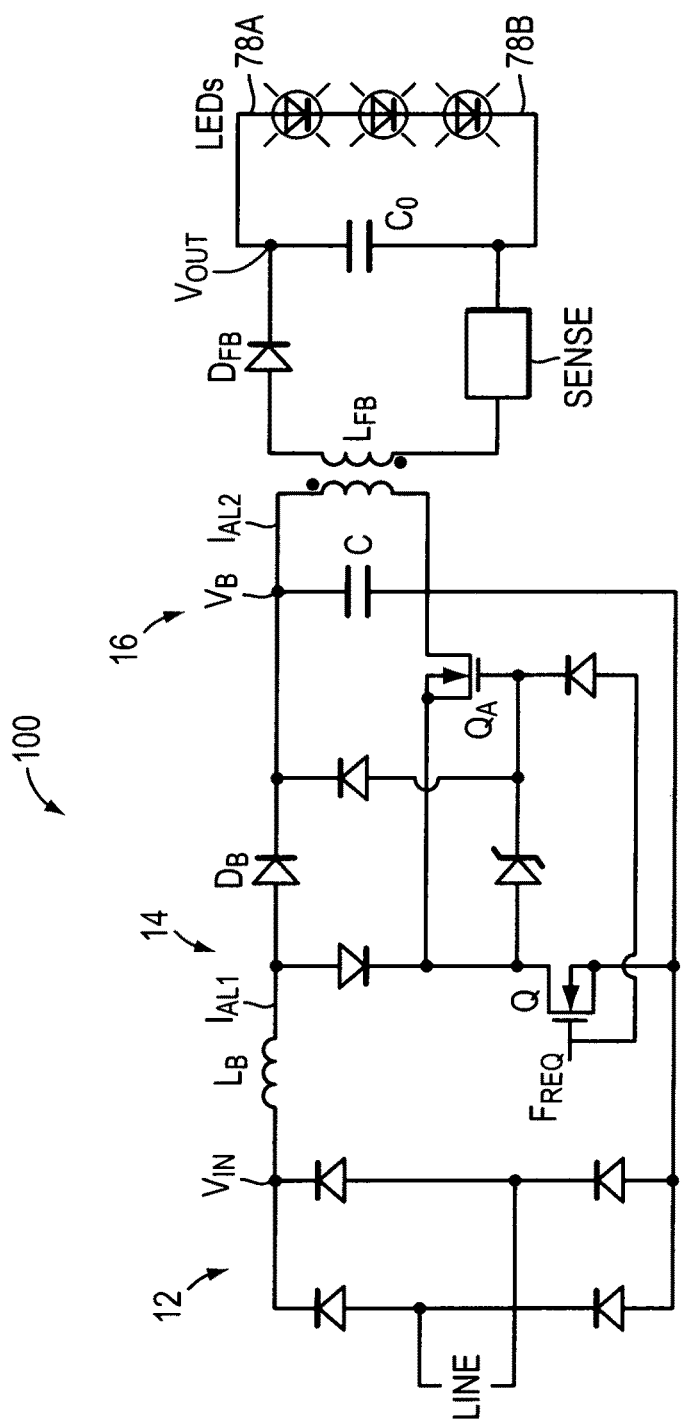
FIG. 7 illustrates another embodiment of the power supply using two switches for controlling current output to several LEDs.
Figure 7A:
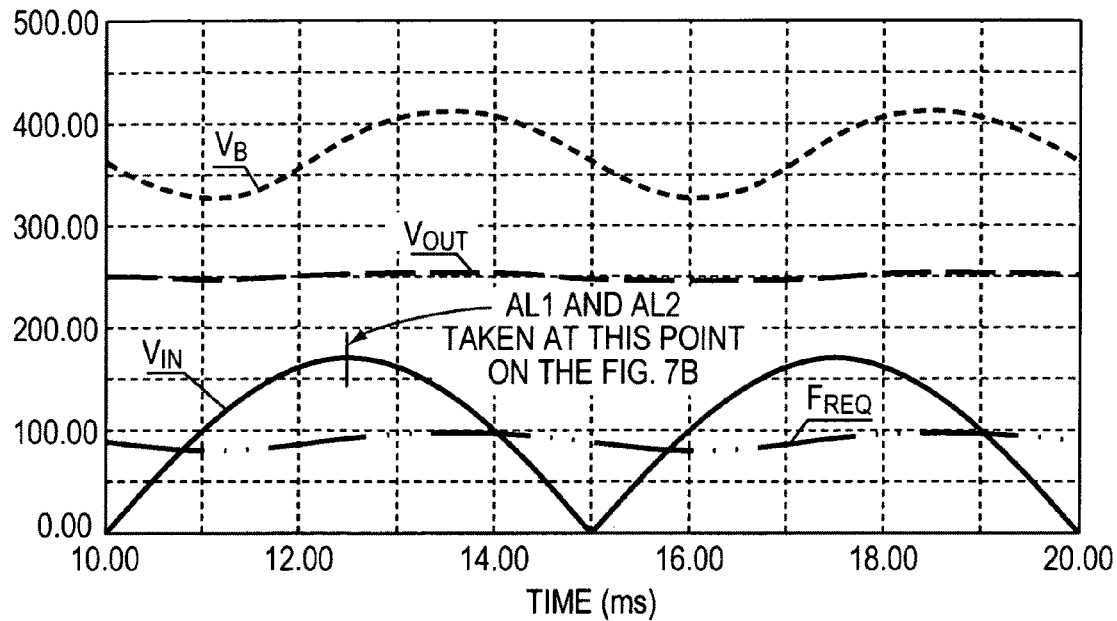
FIGS. 7A and 7B are graphs that illustrate operation of the power supply shown in FIGS. 7 and 8.
Figure 7B:
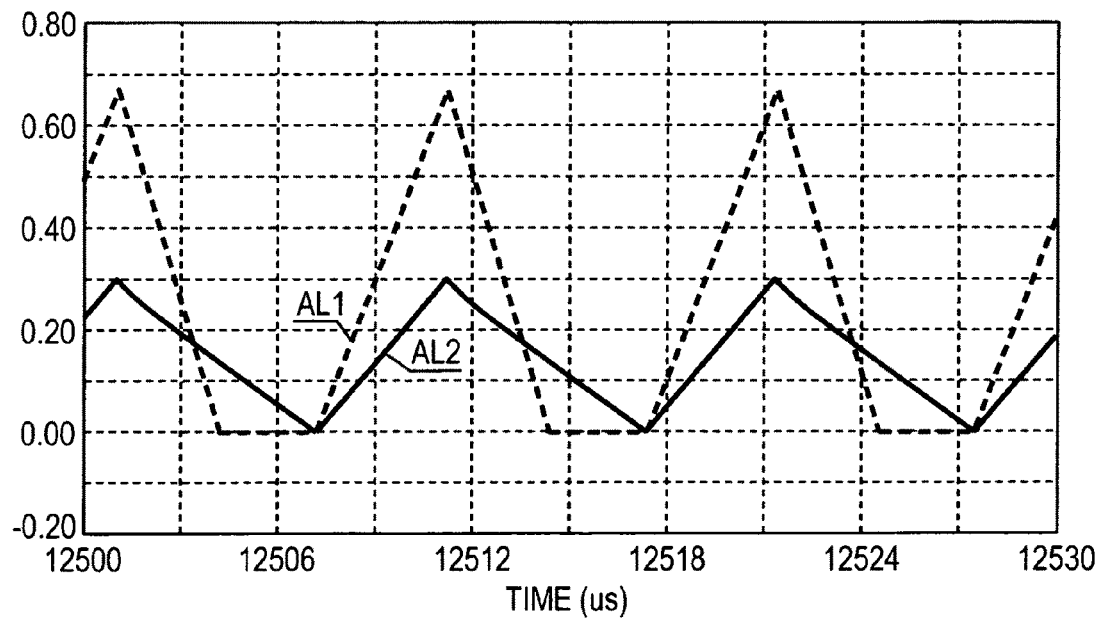

In converter power supply 70, the inductance ratio of the values of $L_B$ and $L_{FB}$ is sized in such a way that the boost converter operates in the discontinuous conduction mode (DCM), where the inductor current $L_B$ is always at zero before the switch is turned on, as shown in FIGS. 7A and 7B. Furthermore, the flyback converter operates in the critical conduction mode (CC mode), where the switch Q is turned back on as soon as the $L_{FB}$ inductor current reaches zero. In this mode of operation, it is established that the bulk capacitor voltage is an approximately linear function of the input line voltage, and it is therefore automatically limited. At the same time, the effect of load changes is automatically and quickly followed at the input. (See FIGS. 7A and 7B.) This is not the case for typical two-stage converters proposed by others, where the PFC pre-regulator suffers from considerable lag.

Importantly, the converter power supplies shown in the present embodiments do not use the bulk voltage as feedback at all, but use the output of the flyback converter as feedback for regulation. Instead, absolutely no feedback is used from the bulk capacitor, its voltage is dictated instead again by the ratio of $L_B/L_{FB}$ and is open loop. Therefore, the value of capacitor C can be very small for the same output power and a large amount of ripple can be tolerated. Our simulation shows 200 v PP of ripple on 375 Vdc. In the converter power supplies shown in the present embodiments the capacitor value is approximately 1/50 (i.e., 2%) of the value it can now be a 1 μF (micro Farad) film type capacitor that has an extremely long life that matches the LED mtbf 100,000 hrs.

The output of the flyback converter is regulated (voltage or current feedback depending on the application) and the error signal sets the flyback inductor $L_{FB}$ peak current that automatically also determines the boost inductor $L_B$ current. The flyback that is regulated has no line frequency ripple at the output as can be seen in the simulation, all the line ripple is on the boost capacitor C instead.

The output circuit of a flyback cell is similar to an ideal current source, assuming that $C_o$ is small. Because this is the case in this topology, and the controlled variable is the output current, compensation of the feedback loop is relatively simple. It can be made fast and stable so that the converter can address variations in the output parameters very effectively.

Another advantage of using the current sourced output provided by the flyback, validating its adoption for this application, is its flexibility when dealing with widely varying output voltages, as is the case with LED strings of variable lengths.

This topology offers the following main advantages:

(1) The DC bulk voltage on capacitor C is independent of output load power and can be mostly determined simply by a judicious choice of $L_B$ and $L_{FB}$ for a given line voltage. In the specific embodiment shown, the values are $L_B$=1.5 mH and $L_{FB}$=9 mH, for the output power of 18 W, the input line voltage 120 Vac, and $V_B$ voltage 375 V.

(2) A single control loop can eliminate the output ripple current even in the presence of large voltage ripple on capacitor C. This allows C to have a small value, making it possible to use high reliability plastic film technology.

(3) The power factor and input current THD are naturally good even in the absence of a dedicated input current control loop. Rather, the input current wave-shaping function is automatically performed by the output control loop; however, the intrinsically accommodating open-loop behaviour of the boost cell operated in DCM allows the power factor to remain acceptable.

(4) As mentioned, the DCM-boost/CC-flyback topology allows for excellent dynamic behavior. Furthermore, the load power level has minimal effect on the bulk voltage of C. Because of these advantages, the load power can be transitioned seamlessly at the output, allowing a simple and inexpensive way of performing the dimming function by simply shorting out the flyback transformer at a given duty ratio using a transistor, as shown in FIG. 6A.

Figure 6A:
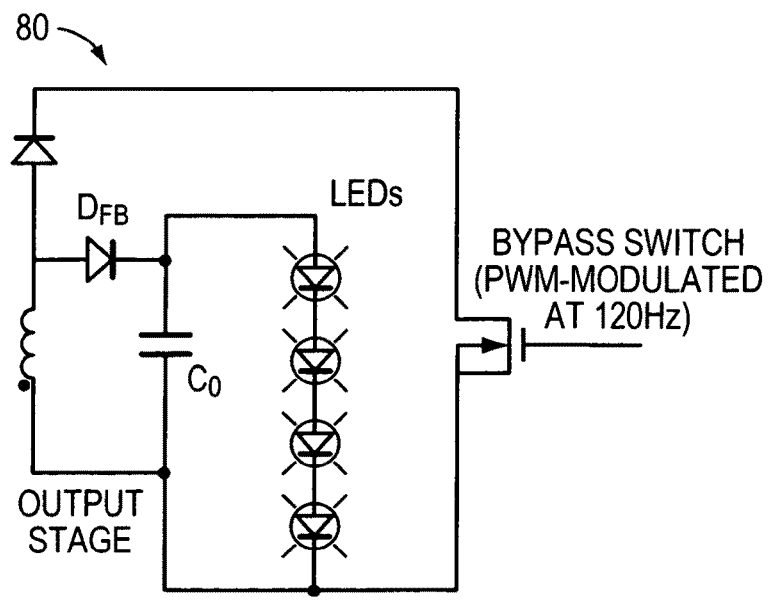
FIG. 6A illustrates an illumination module, for use with the power supply of FIG. 6, designed to provide dimming for the connected LEDs.

Referring to FIG. 6A, module 80 includes a topology that adds, only an inductor and a diode, and uses a simple plastic capacitor, $C_o$. Furthermore, the topology allows for a very simple and inexpensive dimming concept. A small transistor may be employed for shorting out the LED string directly for the dimming purposes.

The present converter power supplies provide input current shaping but sometimes do not eliminate completely the line current distortion. However, even in this case the distortion level meets the common line quality standards applicable to the industry or residential settings. This desirable performance is achieved without the use of any electrolytic capacitor while preventing the current ripple from flowing in the LED string.

FIG. 7 illustrates diagrammatically an improved embodiment of the converter power supply shown in FIG. 6. Converter power supply 100 includes an auxiliary self-driven switch, $Q_A$. This added switch requires no additional drive or control and it is simply a way to optimize semiconductor utilization. In fact, in the basic circuit 70 (FIG. 6), the single switch Q absorbs the sum of the currents from the boost and flyback cells as well as the sum of the voltages from the boost and flyback cells. Thus, the single switch Q needs to be relatively larger as compared to two switches Q and $Q_A$, which could have reduced voltage ratings.

In converter power supply 100, switch Q only absorbs the voltage stress relating to the boost cell, whereas $Q_A$ only absorbs the voltage stress relating to the flyback cell. For typical operation, calculations and simulations show that a single 1000V field-effect transistor (FET) can be substituted by two 500V FETs with a substantial gain in overall efficiency and cost.

Converter power supply 100 provides a resonant turn-on. Because the flyback cell is operated in critical conduction, switches Q and $Q_A$ turn on immediately following the complete discharge of the flyback coupled inductor $L_{FB}$. (See FIGS. 7A and 7B.) Given enough time, the leakage inductance of $L_{FB}$ will ring with the parasitic capacitance of Q. The frequency of this ring is known so that a precise delay can be added following the discharge. If this delay is made to correspond to approximately ¼ period of the ringing, the FETs will turn on while supporting minimal voltage, thus reducing switching loss. This effect will be more substantial at higher loads when overall dissipation is critical.

Figure 9:
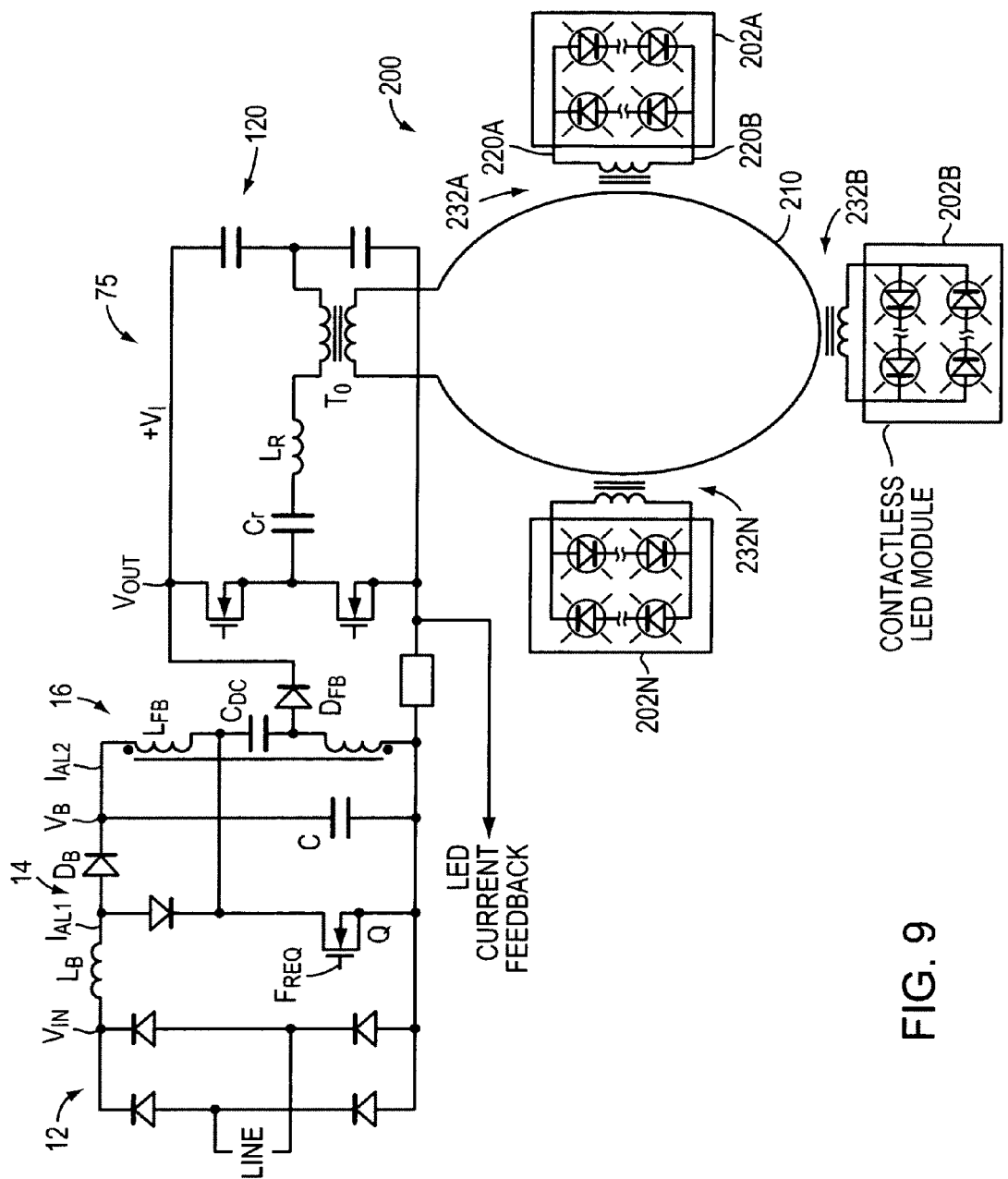
FIG. 9 illustrates another embodiment of a power supply for use with several LED illumination modules having contactless coupling.

FIGS. 7A and 7B are graphs that illustrate operation of the power supply shown in FIGS. 7 and 9, wherein FIG. 7A illustrates the relationship of the input voltage ($V_{IN}$), bulk voltage ($V_B$) and the output voltage ($V_{OUT}$) voltage $V_B$ voltage $V_B$ voltage. In converter power supply 70, the inductance ratio of the values of $L_B$ and $L_{FB}$ is sized in such a way that the boost cell operates in the discontinuous conduction mode (DCM), where the inductor current $L_B$ is always at zero before the switch is turned on, as shown in FIGS. 7A and 7B. Furthermore, the flyback cell operates in the critical conduction mode (CC mode), where the switch Q is turned back on as soon as the $L_{FB}$ inductor current reaches zero (AL2). In this mode of operation, it is established that the bulk capacitor voltage ($V_B$) is an approximately linear function of the input line voltage; it is therefore automatically limited. At the same time, the effect of load changes is automatically and quickly followed at the input. (See FIGS. 7A and 7B.) This is not the case for typical two-stage converters where the PFC pre-regulator suffers from considerable lag.

Figure 8:
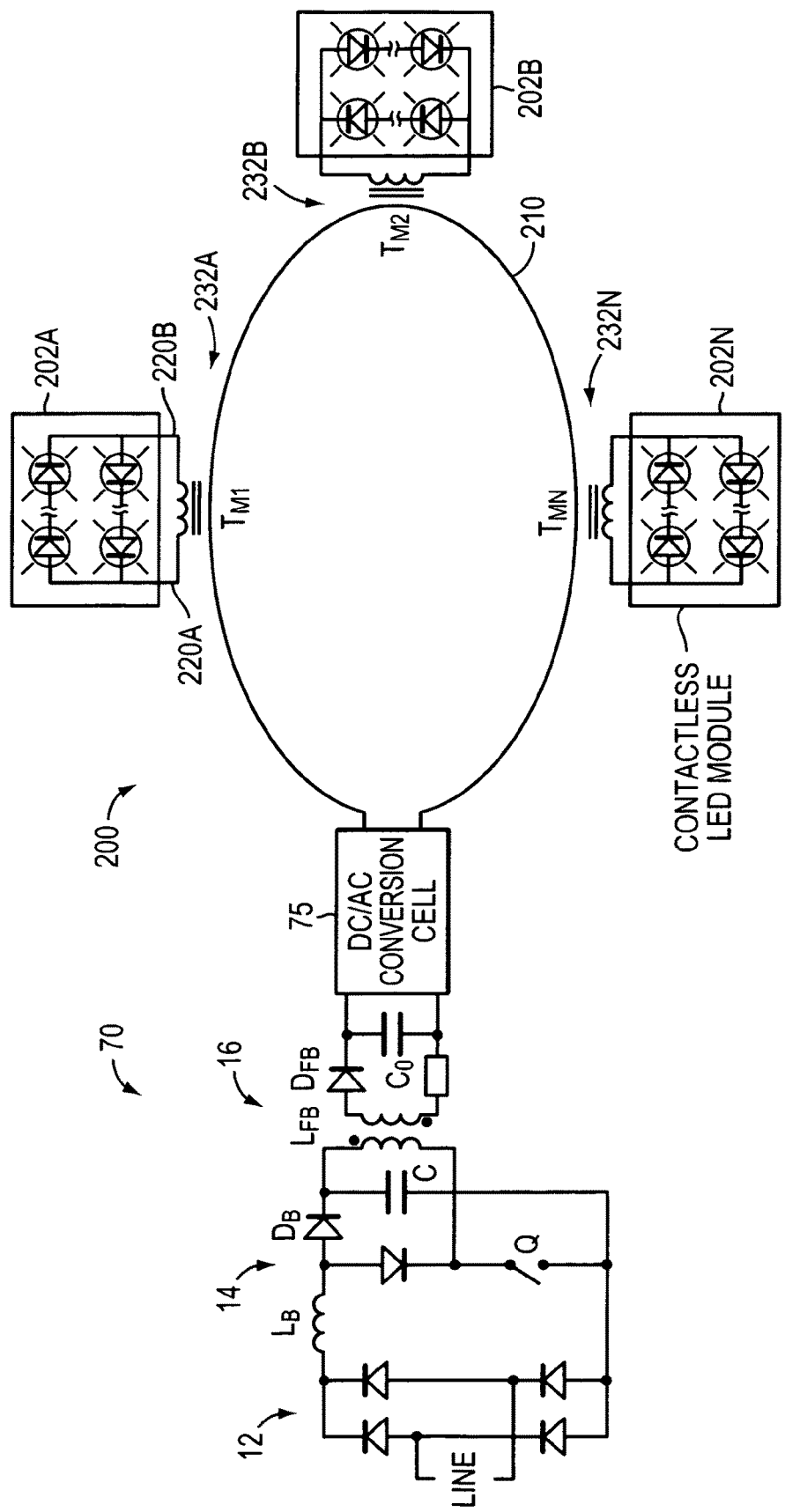
FIG. 8 illustrates another embodiment of a power supply for an LED illumination system designed for several modules each having several LEDs, each module receiving power by contactless coupling.

FIG. 8 illustrates another embodiment of a power supply for an LED illumination system designed for several modules each having several LEDs, each module receiving power by contactless coupling. FIG. 8 illustrates another embodiment of a converter power supply designed for use with several LED illumination modules having contactless coupling, as described in detail below. Converter power supply 70 is coupled to an DC to AC conversion cell 75 that provides current to a current-carrying loop 210 (that is, a primary current loop 210). Several illumination modules 202A, 202B, ... 202N are coupled in a contactless manner to the using current loop 210 using the corresponding transformers $T_{M1}$, $T_{M2}$, ..., and $T_{MN}$. Each illumination module includes an electromagnetic coupling element (shown in detail in FIG. 16 and FIG. 16A) and several light emitting diodes (LEDs).

Figure 8A:
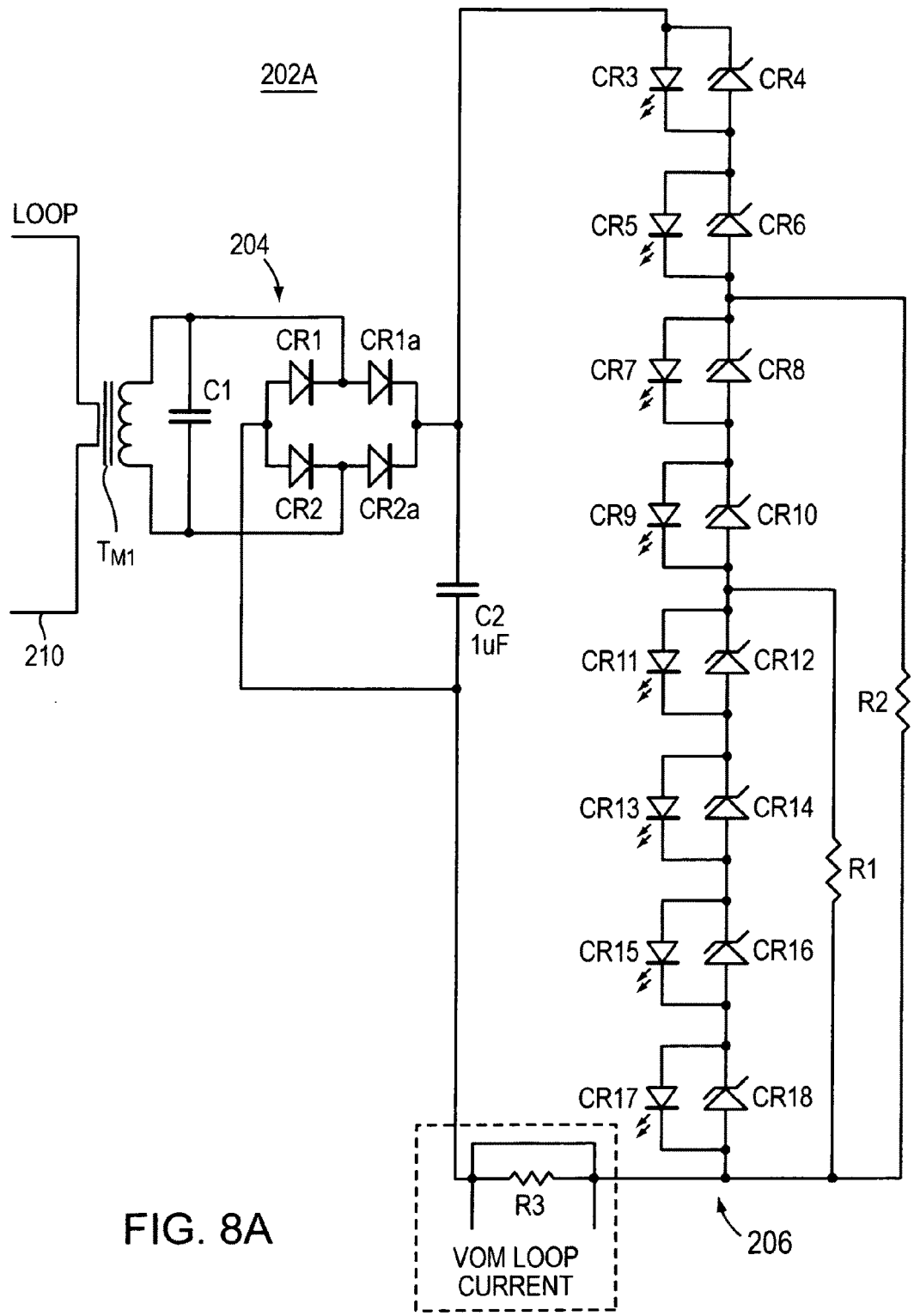
FIG. 8A illustrates a module having several LEDs and receiving power by contactless coupling.

FIG. 8A illustrates a module having several LEDs and receiving power by contactless coupling. Illumination module 280 includes the electromagnetic coupling element (shown in detail in FIG. 16 and FIG. 16A), an AC to DC converter 204, a series of LEDs, and an output for current sensor used for diagnostic purposes. The electromagnetic coupling element receives primary wire 210 and provides secondary wire output across capacitor C1 to AC to DC converter 204. AC to DC converter 204 includes four high-speed double diodes CR1, CR1a, CR2 and CR2a (BAV99 made by Philips Semiconductors). The strip 206 includes, for example, 8 LEDs, each being coupled to a Zener diode. The Zener diodes provide electrical paths in case an individual LED fails so that the remaining LED can still operate.

FIG. 9 illustrates diagrammatically another embodiment of the converter power supply. Converter power supply 120 designed for use with several illumination modules 202A, 202B, ... 202N coupled in a contactless manner to the using current loop 210. Detailed description of the illumination modules 202A, 202B, ... 202N and the description of the contactless coupling to the current-carrying loop 210 is provided below.

Converter power supply 120 is designed keeping in mind the safety regulations pertinent to LED applications limit the accessible output voltage for each string to 60V. Therefore, in order to expand the capacity of the illumination system, many separate channels must be provided. If converter power supply 120 is designed for multi-channel operation, each shall include an isolation transformer. The individual channels may support LED strings of different lengths, thus generating different flyback voltages. In converter power supply 120, the bulk voltage $V_B$ is derived, as before, using a DCM boost and CC flyback, with all the advantages described earlier. The output of the isolated flyback, however, is an intermediate bulk voltage $V_I$. This intermediate voltage feeds a set of output transformers in series-resonant configuration.

Figure 10:
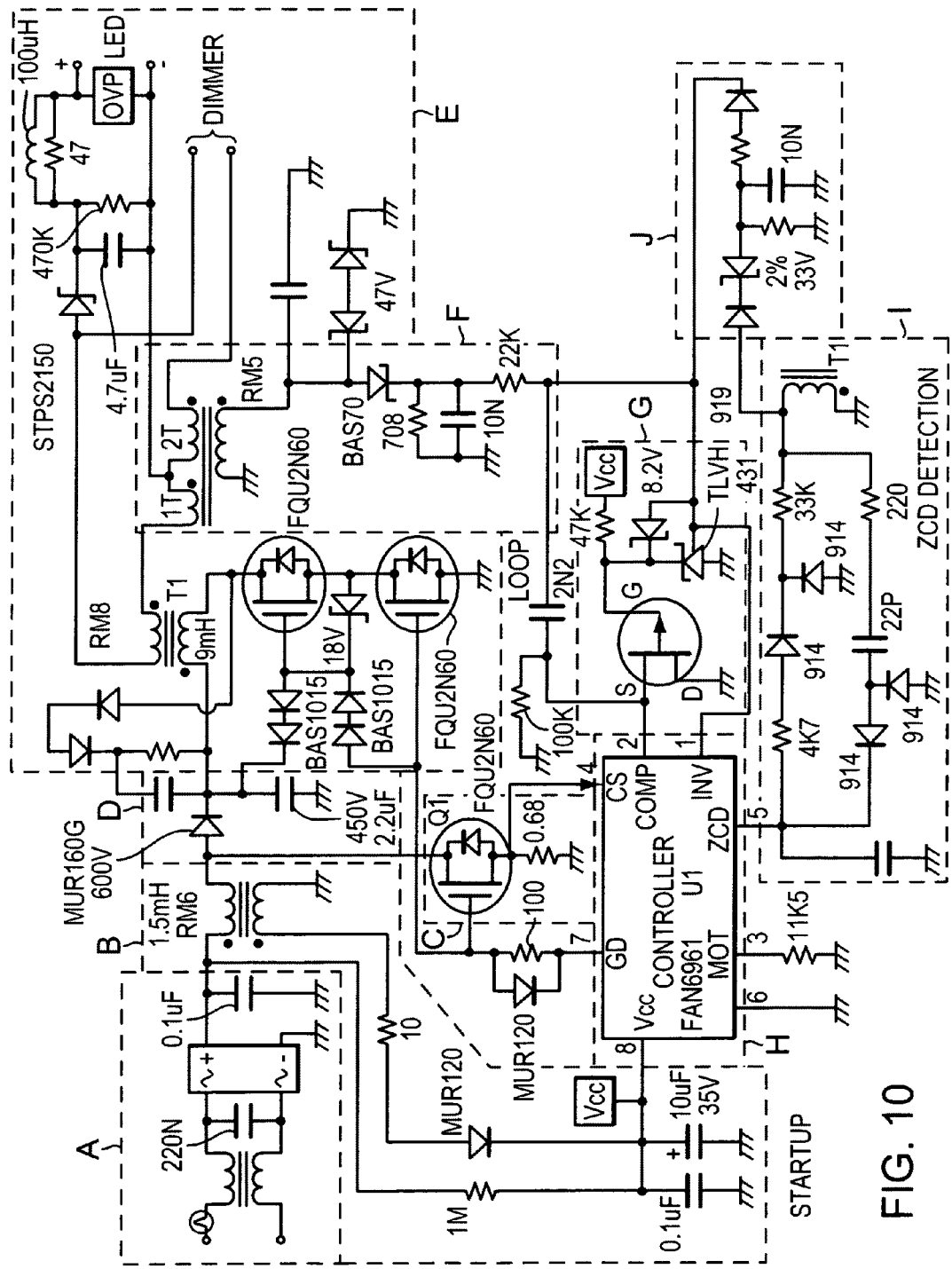
FIG. 10 is a circuit diagram of a power supply for use with a string of LEDs.

FIG. 10 is a circuit diagram of a converter power supply 100A, according to another preferred embodiment. Power supply 100A can provide current to one or several strings of LEDs. The topology of converter power supply 180 can be divided basically into 10 units (delineated as units A, B, C, D, E, F, G, H, I, and J shown in FIG. 10).

Referring to FIG. 10, the input filter and rectifier (delineated as sub-circuit A) rectifies the input line voltage and filters high frequency noise. Converter power supply 180 utilizes the boost cell including a boost choke and a bias transformer (delineated as sub-circuit B), which uses a 1.5 mH choke as the boost inductor, which forms the PFC circuit. A small winding is added in order to produce Vcc bias voltage during operation. The boost cell includes a boost switch and boost current limit sub-circuit (delineated as sub-circuit C), which includes a boost FET switch and small current sensing resistor, added at its source in order to generate a current sense signal that is used by the controller for the boost current limiting purpose. The boost cell also includes a boost diode and output capacitor (delineated as sub-circuit D) for providing output of the boost converter. The boost capacitor is small enough (about 2.2 uF) to be available in non-electrolytic various types of capacitors.

Converter power supply 100A utilizes the flyback cell having a flyback section delineated as sub-circuit E. The flyback includes a 9 mH flyback transformer, a pair of FET switches, an output diode and an output capacitor. The output capacitor has sufficiently small capacitance to be a non-electrolytic capacitor (of any known design). Importantly, all three switches are all driven by the same drive pin (that is, pin 7 on the FAN6961 controller). Therefore, only one main control loop is present. This topology allows for the simple integration of the three switches into a single switch design. The advantage of using three FET switches is that each FET switch can be medium voltage and low current, costing less together than the alternative single high voltage high current FET switch.

Converter power supply 100A includes dimmer connections for a dimmer module that includes a simple PWM type dimmer as shown in FIG. 6A. As is shown diagrammatically in FIG. 6, converter power supply 180 includes a current sense delineated as sub-circuit F. The power supply circuit controls the output current, which is sensed using a current transformer that also offers galvanic isolation. This signal is averaged by the RC filter. This feedback signal is then fed to the controller chip U1 for regulation. The regulator is delineated as sub-circuit G. This circuit does not use the internal error amplifier of the controller U1. Rather and external error amplifier embodied by a shunt voltage reference TLVH431, which is low-voltage 3-terminal adjustable voltage, used for controlling the output current.

Converter power supply 100A includes zero current detector (ZCD) (delineated as sub-circuit I). When the flyback current falls back down to zero following a switch turn-off, the flyback transformer voltage will reverse polarity. A third winding of the transformer is therefore added and used to detect a zero current condition. This signals the beginning of the next turn-on transition and ensures operation in the critical conduction mode. The designed circuit conditions this signal so that it is usable by the controller chip U1. Controller chip U1 is the FAN6961 controller, which is used to generate the driving signals for the boost and flyback switches. All it needs for this purpose is a signal at pin 5 (zero current detector—ZCD) that becomes active at the time the flyback current falls back down to zero following a switch turn-off transition.

Converter power supply 100A also includes an over-voltage or over-power detector (delineated as sub-circuit J). Here, the same transformer winding used for the ZCD function is also be utilized to sense the output voltage of the flyback, since these are theoretically identical when the flyback switch is turned OFF. When this voltage becomes excessive, because of overload, the 33V zener diode will break down and allow the control loop to be affected. In fact, the main current regulating loop will be disrupted and the output current will fold back in order to deal with overload.

Figure 11:
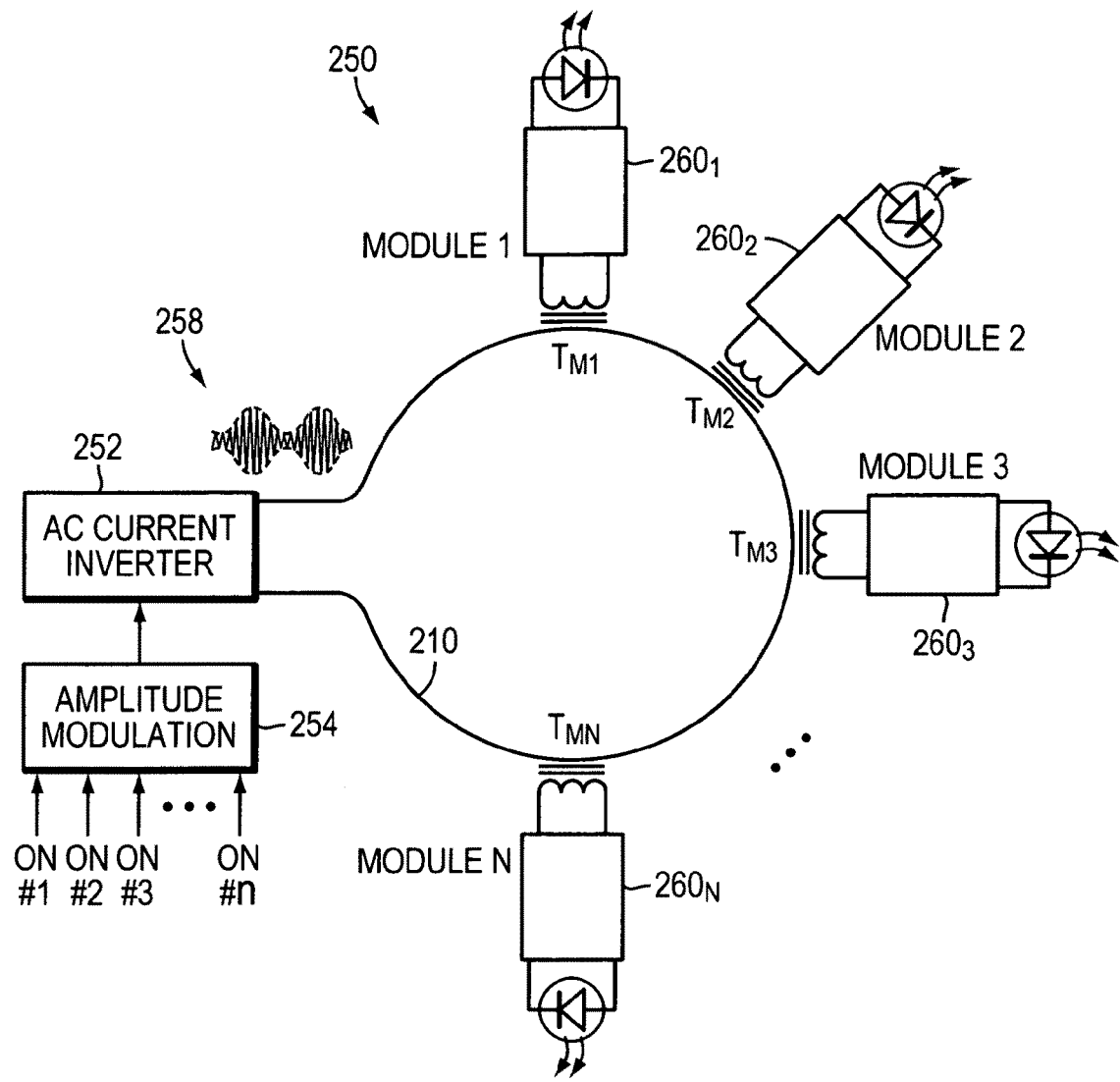
FIG. 11 illustrates an illumination system including an AC current inverter, an amplitude modulator and several illumination modules having contactless coupling, each illumination module being separately controlled by amplitude modulation.

FIG. 11 illustrates an illumination system providing separate on/off control of several illumination modules. The illumination system includes an AC current inverter 252, an amplitude modulator 254 and several illumination modules $260_1$, $260_2$, $260_3$ ... $260_N$ having contactless coupling to current carrying loop 210 via transformers $T_{M1}$, $T_{M2}$, $T_{M3}$, ... $T_{MN}$. Each illumination module is separately controlled by amplitude modulation. This may be used in architectural applications, landscaping applications, in ground transportation vehicles, or in other applications.

AC current inverter 252 produces a high frequency carrier signal 258 modulated by several signals, each with a characteristic frequency. Specifically, the carrier signal is in the range of 20 kHz to 100 kHz, and the modulation signal is in the range of 1 kHz to 10 kHz. Amplitude modulator 254 introduces amplitude modulation (AM) in the current flowing in the current-carrying loop 210. Several modulating signals can be introduced this way using frequency multiplexing. The modules contain a specific frequency discriminator that responds to only one of the several modulating frequencies. Thus each type of module can be activated in response to a given signal introduced in the current-carrying loop. That is, the amplitude modulated (AM) current carrier provides power to the individual LED modules $260_1$, $260_2$, $260_3$ ... $260_N$, but only those modules that can discriminate their own characteristic frequency will actually be enabled and lit up.

Figure 12:
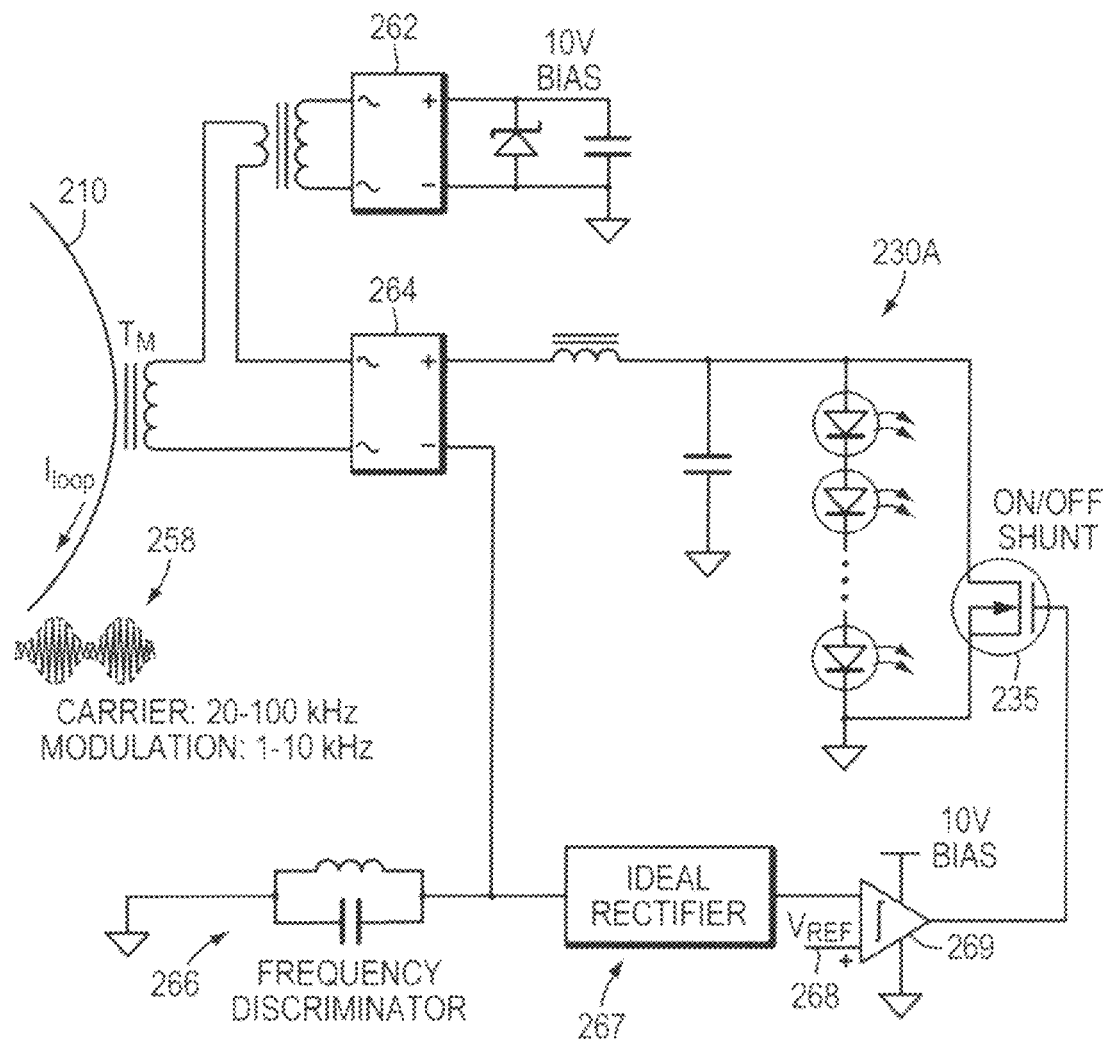
FIG. 12 illustrates one illumination module shown in FIG. 11.

FIG. 12 illustrates one illumination module controlled by the characteristic frequency. The decoding hardware includes two diode bridges 262 and 264, a frequency discriminator 266, an "ideal" rectifier 267, and a comparator 269 providing its output signal to a FET switch 235.

Provided by AC current inverter 252, the $1_{loop}$ current is flowing in current-carrying loop 210 and is amplitude modulated. The current induced in the secondary wire of transformer $T_M$ is rectified by two diode bridges 262 and 264. Diode bridge 262 rectifies the current and produces a rough 10V bias voltage. Diode bridge 264 rectifies the current to drive an LED string 230A. The LC frequency discriminator 266 "recognizes" the presence of the module's characteristic activation frequency in the drive current signal $1_{loop}$. If the activation frequency is detected, a large voltage is developed in LC frequency discriminator 266 due to resonance. This voltage is rectified by rectifier 267, and compared to a reference voltage 268 in comparator 269. Comparator 269 causes the comparator output to turn off the FET switch 235 that acts as an on/off shunt. Thus, a given LED string is lit up only if the activation frequency that is characteristic to its module is present in the current $1_{loop}$.

The AM system shown in FIGS. 11 and 12 takes advantage of the relatively high frequency in the current-carrying conductor (20-100 kHz) to provide a relatively simple and inexpensive system compared to Power Line Communication (PLC) systems. The AM system shown in FIGS. 11 and 12 avoids adding communication channels on different media alongside the power connections, does not use superimposed communication signals injected at frequencies much higher than the loop current used at 20-100 kHz. The present solution also avoids expensive modems and decoding hardware repeated at each module, which is also relatively complex for (PLC) systems.

Figure 13:
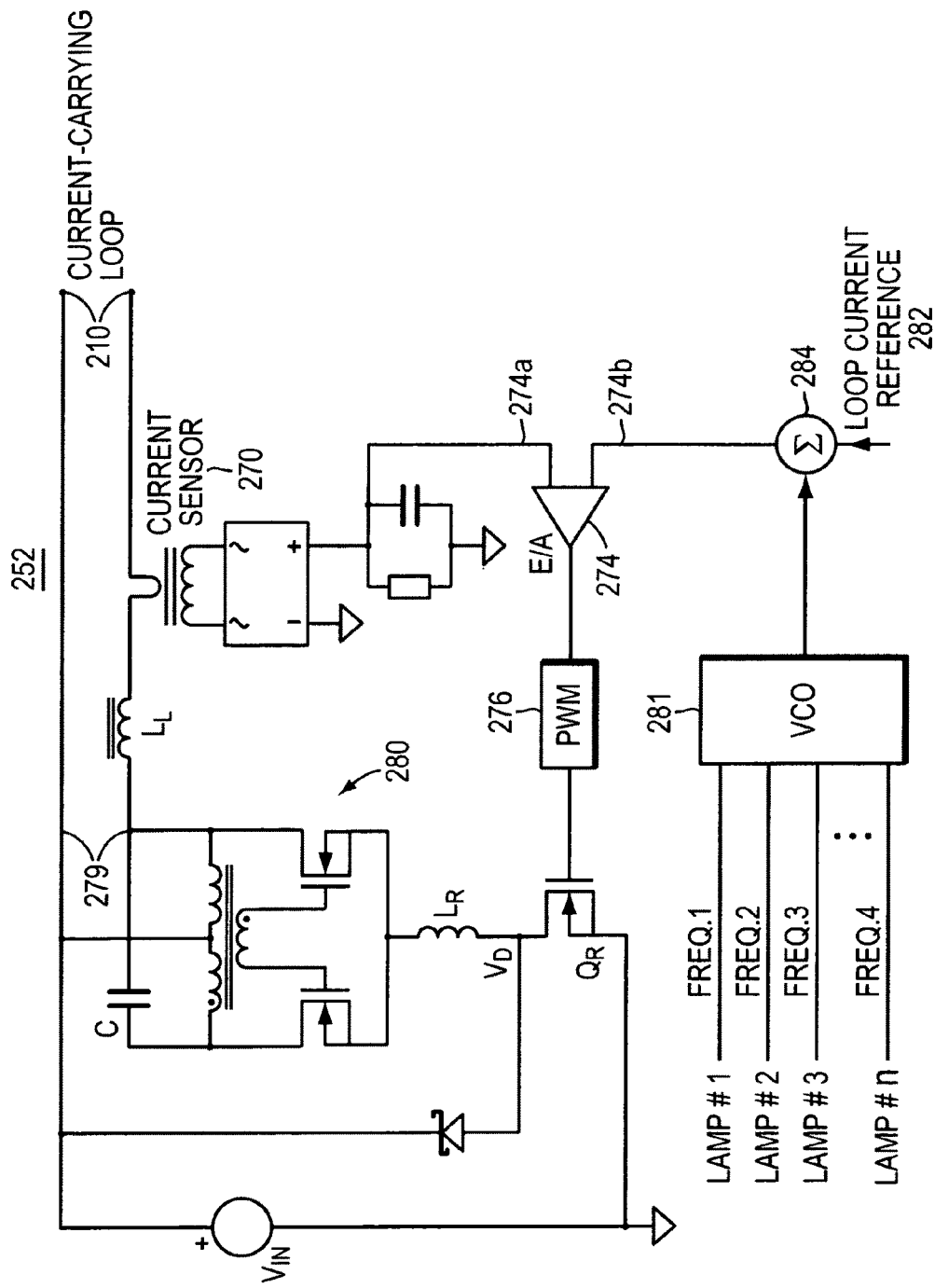
FIG. 13 illustrates one embodiment of the AC current inverter and the amplitude modulator shown in FIG. 11.

FIG. 13 illustrates one embodiment of the AC current inverter and the amplitude modulator shown in FIG. 11. The current inverter is in the form of a Royer oscillator 280. Royer oscillator 280 includes a transformer with a primary winding, and a feedback winding. The primary winding is centre-tapped, with each half driven by a transistor collector. The feedback winding couples a small amount of the transformer flux back in to the transistor bases to generate the oscillations. A capacitor across the primary winding gives the transformer a resonance, which sets the oscillation frequency.

In FIG. 13, inductance $L_L$ stabilizes the oscillation voltage into an AC current at high-frequency. This carrier current in the loop has a frequency of the order of 20 kHz-100 kHz. The amplitude of the carrier current is controlled by a feedback control loop consisting of a current sensor 270, which produces a DC voltage proportional to the loop current. This voltage 274a is compared to a reference voltage 274b in a comparator 274. The compensated error is provided to a high-frequency pulse with modulator 276 (PWM block 276). The PWM signal is then used to drive FET $Q_R$, which, in turn, regulates the average value of voltage $V_D$. If the PWM frequency is sufficiently high, Royen oscillator 280 operates only by responding to the average value of $V_D$, which directly controls the amplitude of the loop current $l_{loop}$ in current-carrying loop 210.

In FIG. 13, the reference for the loop current $l_{loop}$ is modified to include several low-frequency modulating signals that will appear on the carrier current. The presence or absence of a given modulating signal is determined by a number of control on/off signals (See, Lamp #1, Lamp # 2, etc, shown in FIG. 13) provided to a VCO block 281. This way the selective AM modulation is achieved.

Figure 14:
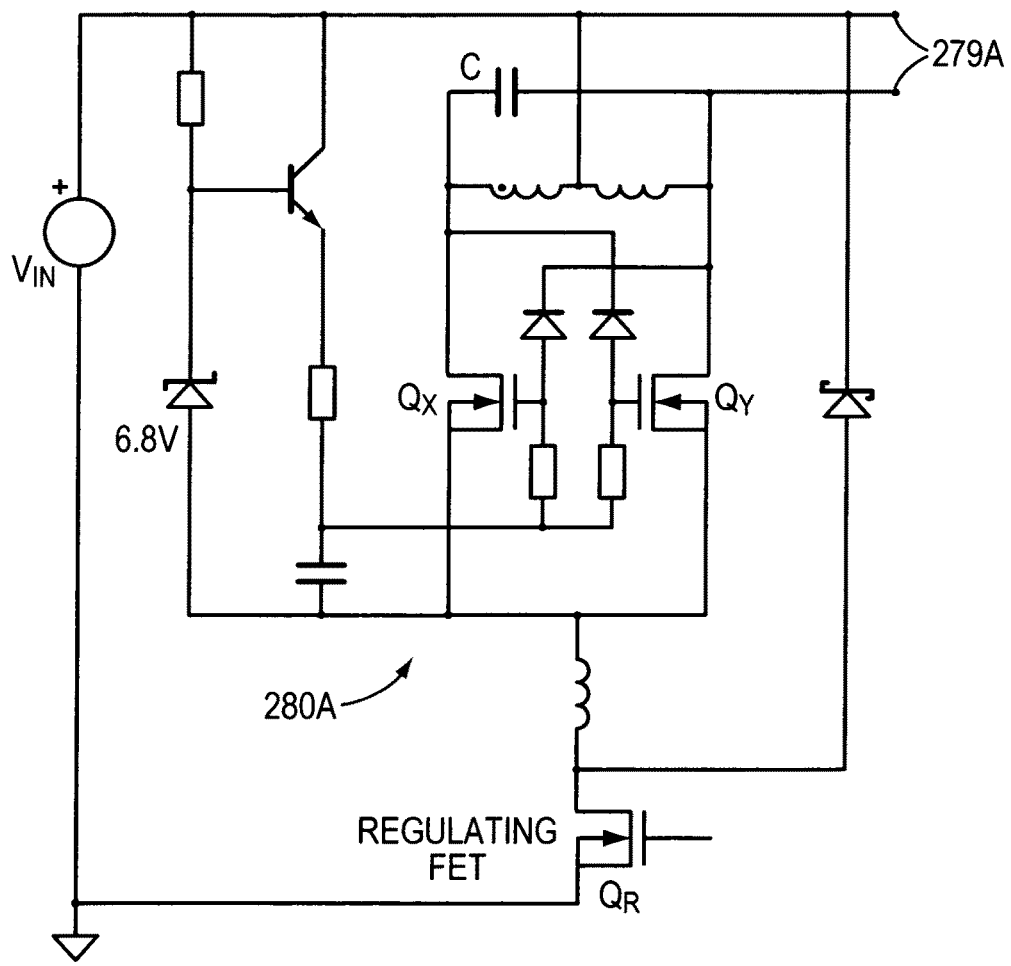
FIG. 14 illustrates one embodiment of an oscillator for use in the AC current inverter shown in FIG. 11.

FIG. 14 illustrates one embodiment of an oscillator 280A can replace Royer oscillator 280 uses in the AC current inverter of FIG. 13. Oscillator 290 includes a pair of drive transistors $Q_x$ and $Q_y$. This circuit uses a simple bias circuit and couples the gate voltage of one drive transistor to the drain of the other drive transistor. This allows for a simpler construction of the oscillator transformer by removing the driving winding.

Figure 15:
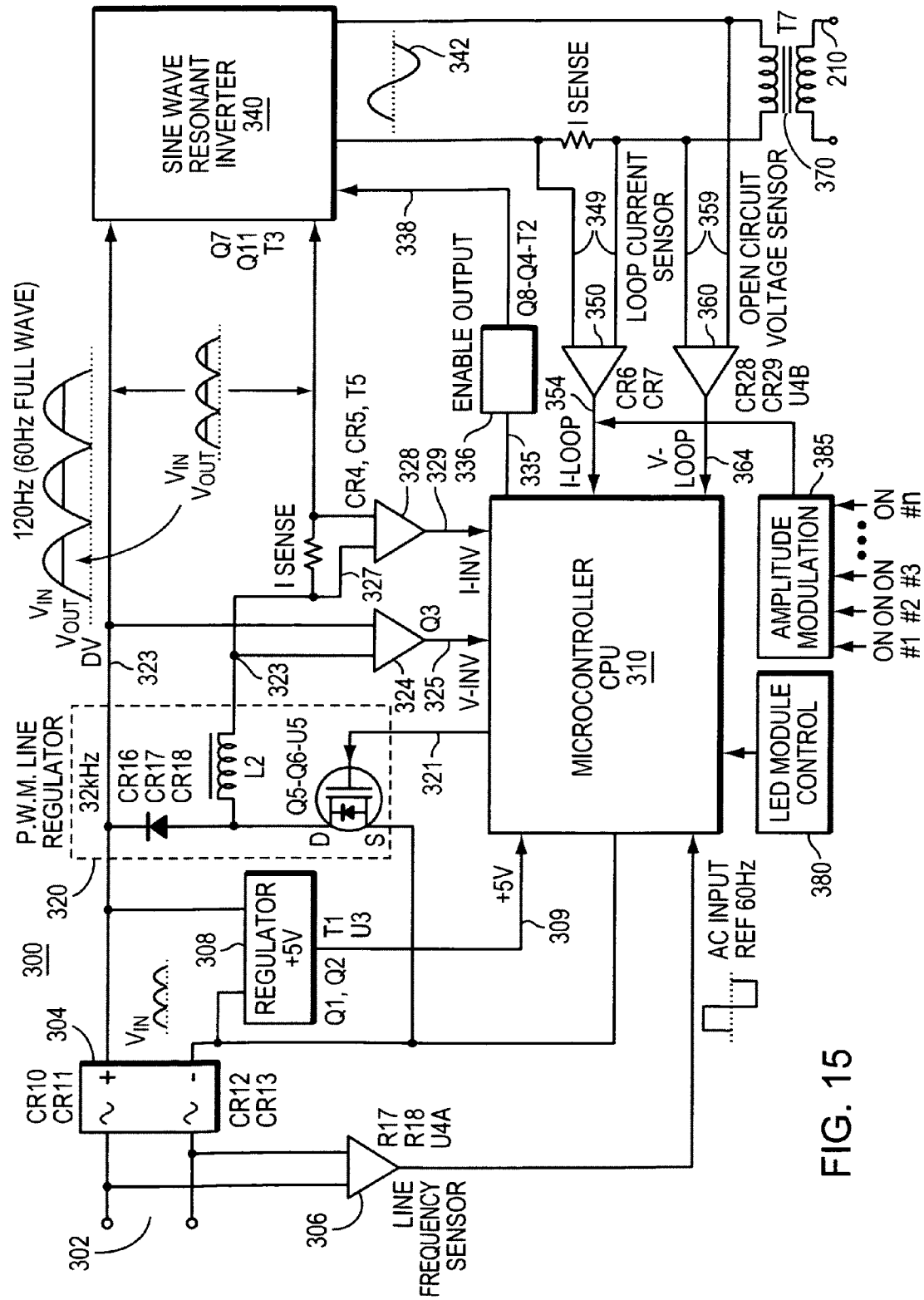
FIG. 15 is a circuit diagram of a power supply for use with several illumination modules having contactless coupling, each illumination module being separately controlled by a characteristic frequency.

FIG. 15 is a circuit diagram of an HF power supply 300 for use with several illumination modules $260_1, 260_2, 260_3 \ldots 260_N$ having contactless coupling, as shown in FIG. 11. Each illumination module can be controlled separately by a characteristic frequency, as explained above. High frequency power supply 300 is described in detail in U.S. Pat. No. 7,928,664, which is incorporated by reference as if fully reproduced herein. The module control can be performed using either an LED module controller 380, or an amplitude modulation unit 385. Amplitude modulation unit 385 provides modulation to the reference for the current input 354.

Referring to FIG. 15, HF power supply 300 includes an AC to DC converter 304, a line frequency sensor 306, a regulator 308, a pulse width modulator (PWM) line regulator 320, and a microcontroller 310 receiving a voltage feedback 325 and a current feedback 329. P.W.M. line regulator 320 operates at 32 kHz and provides output to a current fed resonant inverter 340. Sine wave resonant inverter 340 receives an enable output 338 from microcontroller 310, and resonant inverter 340 provides a 16 kHz sinusoidal output 342 to the current source. A current sensor 350 is arranged in a feedback loop to provide an input to microcontroller 310 (MC68HC908QY4 made by Motorola Inc.). Furthermore, an open circuit voltage sensor 360 is connected across the output from resonant inverter 340 to signal open circuit condition to microcontroller 310. The AC current source provides a sinusoidal output to current loop 114 via a transformer 370. Microcontroller 310 controls by software the maximum power output, the maximum output voltage, the loop current and/or other parameters of the power supply 300. Microcontroller 310 also registers the fault conditions of the illumination system and adjusts accordingly the voltage or current provided.

In HF power supply 300, the 110V AC power input is provided to four SMA controlled avalanche rectifiers CR4, CR5, CR6, and CR7. Regulator 308 includes two (2) NPN switching transistors Q1 and Q2 (MMBT3904 made by Philips Semiconductors), a transformer T1 and a low-power low-dropout linear regulator U3 (TPS76050 made by Texas Instruments).

Resonant inverter 340 has a sinusoidal resonant circuit topology that includes four PNP transistors Q7, Q9 Q10 and Q11 (MMBT4403). In resonant inverter 340, two pairs of transistors (Q9-Q11 and Q7-Q10) are connected so that in each pair the emitter of the first transistor drives the base of the second transistor (i.e., a Darlington pair). These two pairs are turned ON and OFF via transformer T4 to provide an oscillating current at a high current gain. The 16 kHz output is provided to transformer T7 and to current sensor 350 and open circuit voltage sensor 360.

Figure 16:
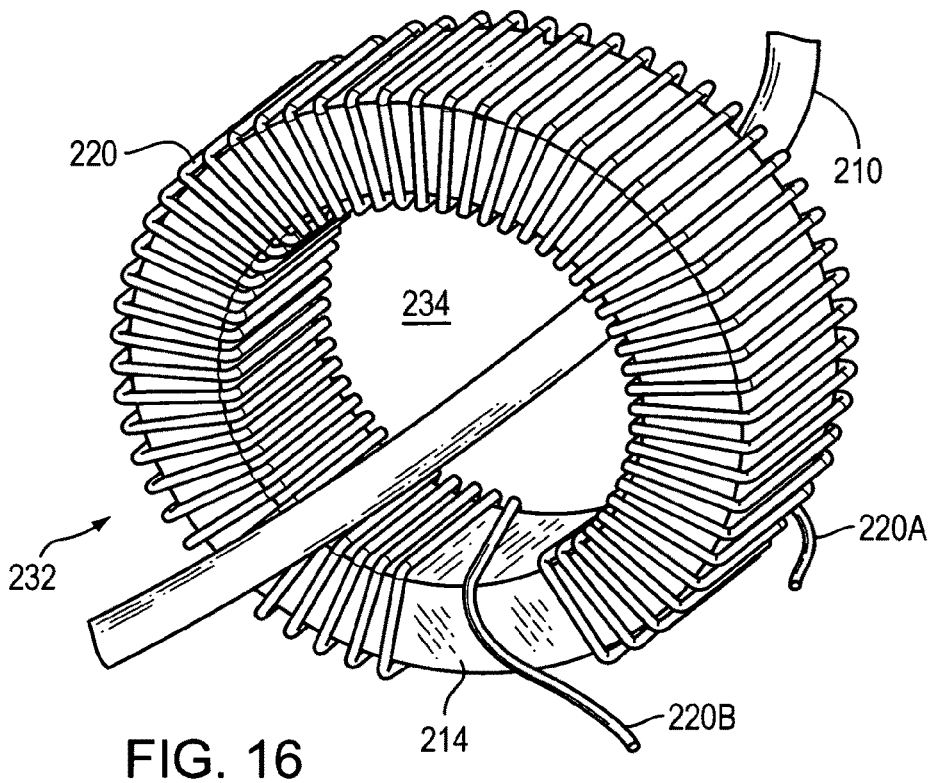
FIG. 16 illustrates a contactless coupling element for use with the illumination systems shown in FIG. 8, 9, or 11.
Figure 17:
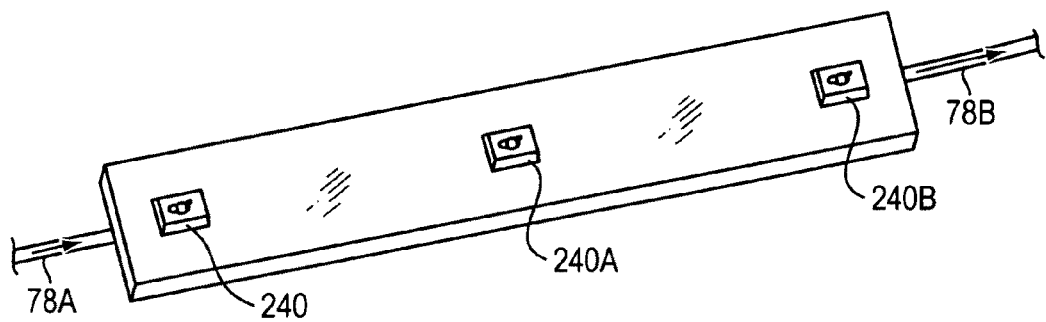
FIG. 17 illustrates a string of LEDs for use with the illumination system of FIG. 6 or 7.
Figure 17A:
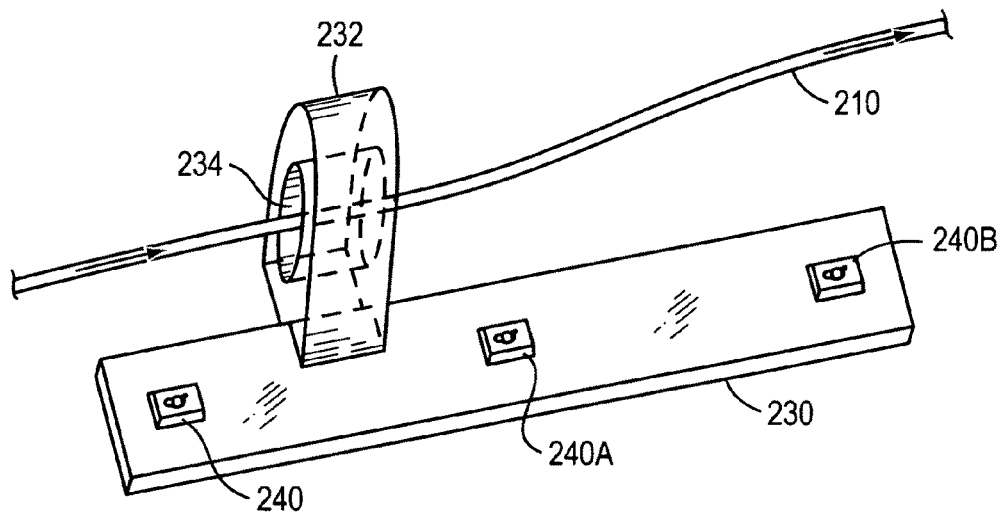
FIG. 17A illustrates one illumination module used with the illumination system of FIG. 8, 9 or 11, and having a contactless coupling element shown in FIG. 16 or 16A.

FIG. 17 illustrates an LED strip directly connected to an output rectifier and filter as shown in FIG. 6. FIG. 17A illustrates a single illumination module. Each contactless illumination module includes the electromagnetic coupling element receiving a primary wire 210 (that is a current-carrying wire 210) and a secondary wire 220 inductively coupled together using a magnetic element 214 (preferably made of a ferrite material). Secondary wire ends 220A and 220B are connected to an AD to DC converter providing power to LEDs, which are a DC load. Electromagnetic coupling element 232 (shown in FIG. 16) includes a secondary wire 220 wound around ferrite core 214 to form a coil, wherein secondary wire 220 is electrically connected to provide current to the LED light sources. Ferrite core 214 is constructed and arranged to receive current loop 210 inside the corresponding magnetic path in a removable arrangement. Advantageously, this enables easy and convenient assembly of several illumination modules, for example inside a letter channel. As shown in FIG. 8, several LEDs are connected together. The absence of a ballast resistor connected to the LEDs increases the efficiency (which may be even greater than 95%) obtained from the input power for the light source to produce light.

Referring to FIG. 16, electromagnetic coupling element 232 is preferably a sealed unit having the secondary wire wound around the ferrite core, with both the secondary wire and the ferrite core sealed in a water resistant manner. Electromagnetic coupling element 232 couples the electric power from primary wire 210 to secondary wire 220 (FIG. 16 or 16A) by induction as expressed in Faraday's law. That is, the AC current in primary wire 210 induces a voltage in coil 220 of the secondary wire, which provides electrical power delivered to the light sources. The secondary current is equal to the primary current divided by number of turns. As shown in FIG. 8 or FIG. 9, primary wire 210 is electromagnetically coupled (i.e., "proximity coupled") to several secondary wires by the contactless electromagnetic coupling element, and thus primary wire 210 induces a voltage in several secondary coils wound around the ferrite cores. The output of electromagnetic coupling element 232 provides a true current source coupled to secondary wire 220. While current loop wire 210 (i.e., the primary wire 210) is preferably located inside the ferromagnetic core within the magnetic flux loop, other positions and geometries with respect to the ferrite core may be used as long as sufficient inductive coupling occurs.

Electromagnetic coupling element 232 (shown in detail in FIG. 17A) also includes a secondary wire wound around the ferrite core to form a coil, wherein secondary wire is connected to provide current to light sources 240. Electromagnetic coupling element 232 is preferably a sealed unit having the secondary wire wound around the ferrite core. The secondary output of electromagnetic coupling element 232 provides a true current source.

In illumination module 202, the output from secondary wire 220 provide AC current directly to LEDs. In this AC load, one half of the LEDs is powered on the positive cycle and the other half on the negative cycle. There is no need to use a ballast resistor coupled to the LEDs, since the magnetic core winding generates a true current source. The absence of a ballast resistor connected to the LEDs increases the efficiency (which may be even greater than 95%) obtained from the input power for the light source to produce light. The LEDs may be replaced with incandescent lamps, electroluminescent devices, or other low-voltage to medium-voltage light sources.

Illumination module 202 includes the electromagnetic coupling element with a primary wire 210 and a secondary wire 220 inductively coupled together using a magnetic element (preferably made of a ferrite material). Secondary wire 220 is connected to an AD to DC converter 204 (FIG. 8A) providing power to LEDs; that is a DC load. Electromagnetic coupling element 232 (shown in FIG. 16) includes a secondary wire 220 wound around ferrite core 214 (FIG. 16) to form a coil, wherein secondary wire 220 is electrically connected to provide current to the LEDs. Ferrite core 214 is constructed and arranged to receive current loop 210 inside the corresponding magnetic path in a removable arrangement. Advantageously, this enables easy and convenient assembly of several illumination modules, for example inside a letter channel. Several LEDs are connected together. The absence of a ballast resistor connected to the LEDs increases the efficiency (which may be even greater than 95%) obtained from the input power for the light source to produce light.

Figure 16A:
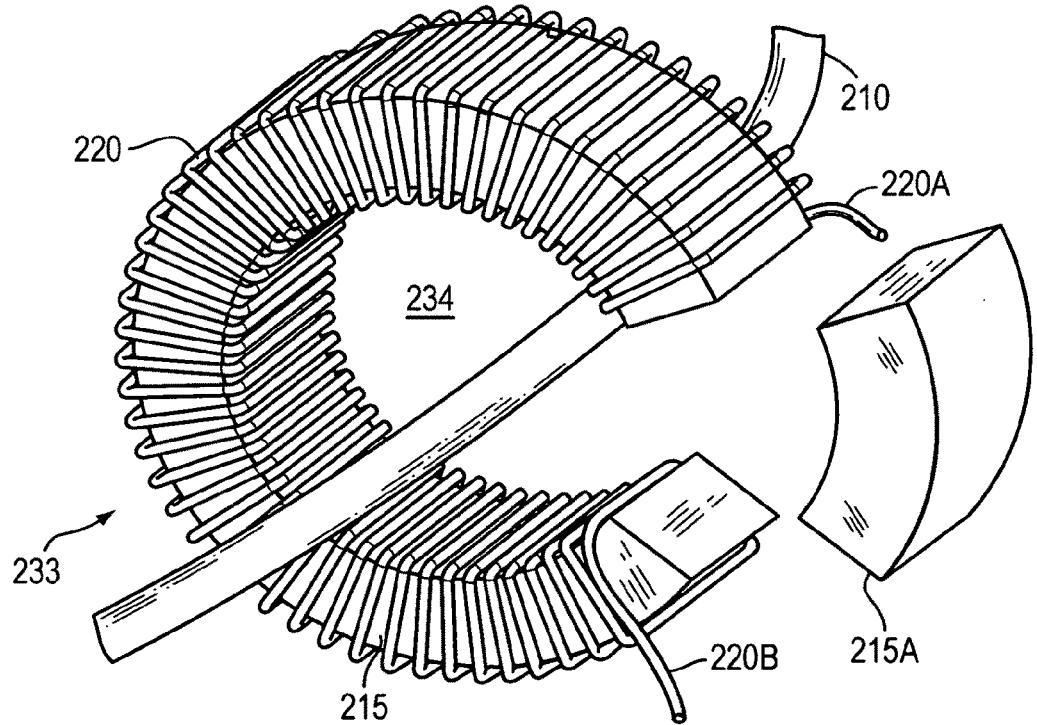
FIG. 16A illustrates another embodiment of a contactless coupling element having a magnetic core formed by two discrete elements and being suitable for use with the illumination systems shown in FIG. 8, 9 or 11.

Referring to FIG. 16A, electromagnetic coupling element 233 includes a secondary wire 220 wound around ferrite core 215 to form a coil, wherein secondary wire 220 is electrically connected to provide current to the LEDs. Ferrite core 215 includes a removable portion 215A forming together a closed magnetic path in a removable manner. The removal of portion 215A enables accommodation of current loop 210 inside ferrite core 215 even without threading wire 210 through the opening as in ferrite core 214. Advantageously, this enables easy and convenient assembly of several illumination modules.

Electromagnetic coupling element 232 (or 233) couples the electric power from primary wire 210 to secondary wire 220 by induction as expressed in Faraday's law. That is, the AC current in primary wire 210 induces a voltage in coil 220 of the secondary wire, which provides electrical power delivered to the LEDs. The secondary current is equal to the primary current divided by number of turns.

FIG. 16A illustrates a contactless coupling element 233 having a magnetic core formed by two discrete elements 215 and 215A providing a closed magnetic loop. Contactless coupling element 233 is suitable for use with any one of the illumination modules shown in FIG. 8 or FIG. 9. Advantageously, current loop 210 can be placed inside ring 234 by removing and subsequently re-attaching core element 215A with respect to core element 215. This design allows easier and faster assembly of the system, where the ferrite core is arranged to receive the current loop in a removable arrangement.

FIG. 17A illustrates an illumination strip (or light module) located in letter channel 218. As described above, electromagnetic coupling element 232 shown in FIG. 16, and in detail in FIG. 16A, provides contactless coupling (i.e., coupling without an electrical contact) to the illumination modules shown in FIG. 8 or FIG. 9.

Figure 17B:
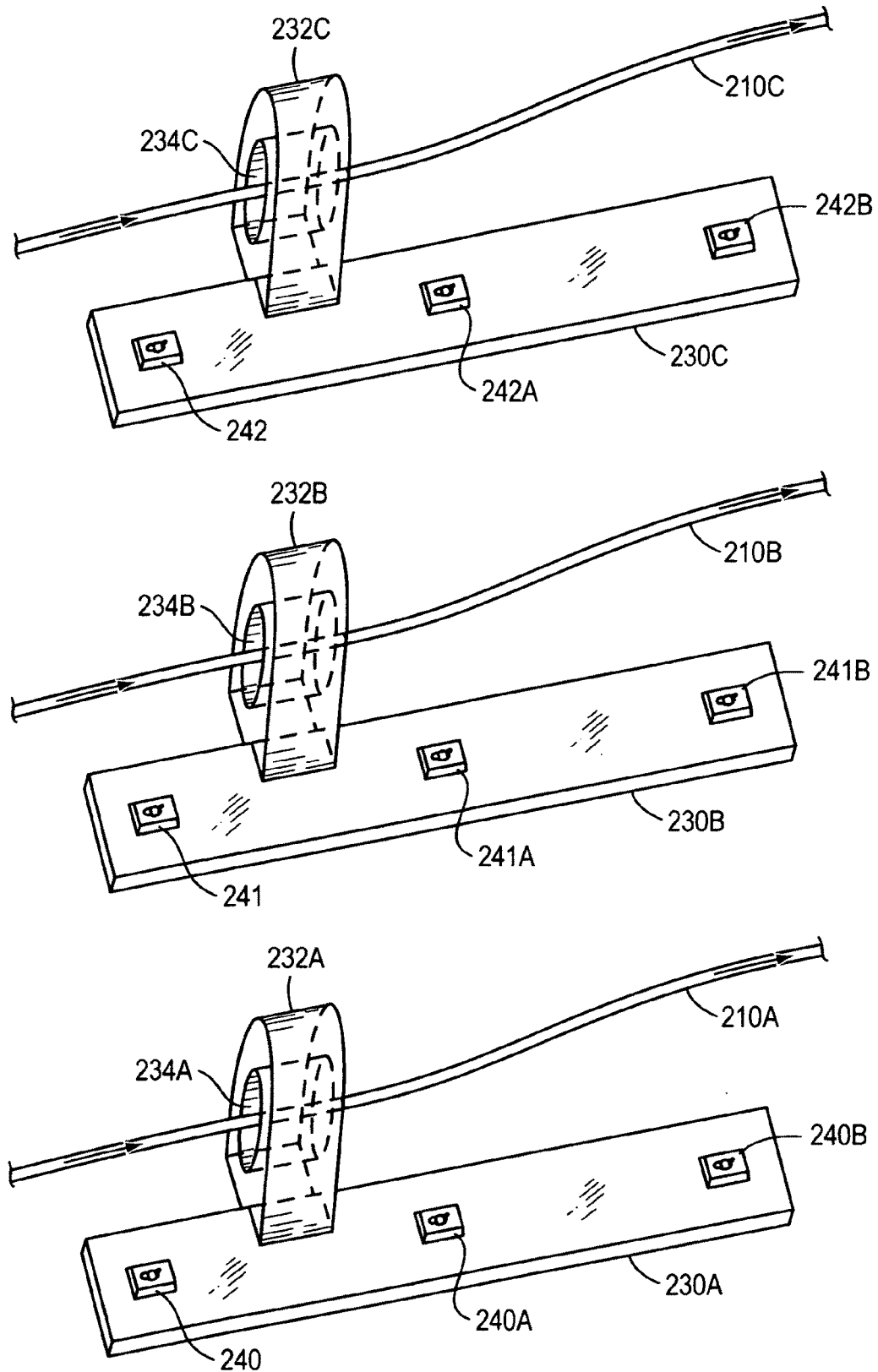
FIG. 17B illustrates several illumination modules for multicolor illumination used with an illumination system providing several current-carrying loops.

FIG. 17B illustrates the illumination system utilizing a power supply for several illumination strips 230A, 230B, and 230C. Each illumination strips 230 can have different color light sources (for example, red, green or blue). The illumination strips may be controlled separately by controlling the current in the separate current loops 210A, 210B, and 210C (e.g., by employing a computerized control on each loop). This way, the illumination system can generate different light effects.

Figure 18:
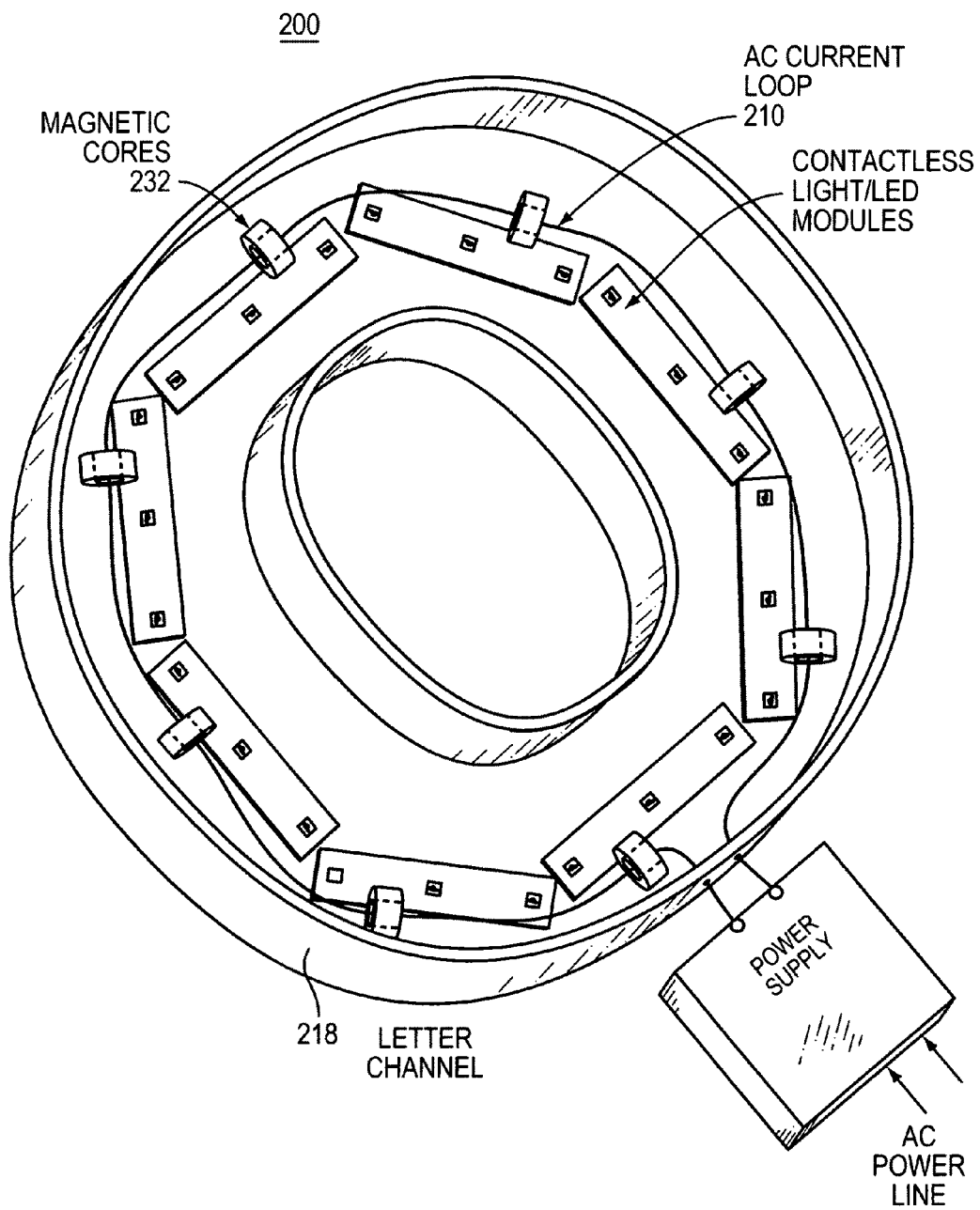
FIG. 18 illustrates an illumination system including an AC current inverter and several illumination modules installed in a letter channel and a power supply.

FIG. 18 illustrates an illumination system 200 including several illumination modules installed in a letter channel 218 and power supply 70 (or power supply 120). The high-frequency AC voltage power supply provides current to an AC current loop 210, which provides power to the individual illumination modules (shown as light strips) located in letter channel 218.

The above-described illumination systems may be used with different illumination modules including commercially available light sources. There are several different commercially available embodiments of the LED modules. Super White STP30XC Hi-Flux StripLED® Modules may be used alone or connected to one another, enabling configuration of channel and reverse-channel letters, signs, and displays. These modules are available in lengths of 6, 12, and 24 in. strips, and feature 6, 12, and 24 Cool White 7,500 K Spider LEDs, respectively. Each module includes a double-ended connector harness for daisy-chain assembly, and a pre-applied strip of 3M® double-sided foam tape for peel-and-stick placement.

Alternatively, hi-flux, interconnectable StripLED® LED modules may be used, which deliver high brightness and possess high flexibility. Specifically, LEDtronics® manufactures series STP30XC super white LED light strips that may be used alone or connected to one another, making it easy to configure lighting solutions for channel and reverse-channel letters, signs, displays, under-the-counter and architectural applications. These light strips are available in lengths of 6-inches, 12-inches and 24-inches, and they feature 6, 12 and 24 Cool White (7500K) LEDtronics SpiderLEDs, respectively. The STP306 is a 6-inch, 6 LED model that uses 0.72 Watts, emits 1.2 fc and provides 29 lumens with a viewing angle of 85°. The STP324 is a 24-inch, 24 LED model that uses 2.88 Watts, emits 48 fc and provides 115 lumens with a viewing angle of 85°. Each module has a double-ended connector harness for easy daisy-chain assembly, and a pre-applied strip of 3M® double-sided foam tape for "peel and stick" placement. The Inter-Connector Module facilitates linking modules. One Inter-Connector module and one power adapter cable are included with each light strip purchased. In addition to channel-letter applications, Strip LED may be used in buildings, amusement parks, theaters, stairways, emergency exit pathway lighting, etc. These light strips eliminate many of the shortcomings of neon or fluorescent lamps such as heat, broken tubes and ballast failures.

FIGS. 19 and 19A illustrate a coupling box 400 for use with the illumination systems shown in FIG. 8, 9 or 11. Coupling box 400 two box parts 402 and 404 coupled with a hinge 406. Box part 402 includes a magnetic core 410 with an opening 408 for receiving current loop 210. Box part 404 includes a magnetic core 412. The two box parts 402 and 404 are cooperatively designed to provide a closed magnetic loop by placing magnetic core 412 in contact with magnetic core 410, when the box parts 402 and 404. This design enable quick and easy placement of current loop 210 inside the magnetic core for proper electromagnetic coupling. A return current loop 210 is located outside of the magnetic core. Coupling box 400 includes a transformer and a rectifier and a capacitor. Wires 220A and 220B are connected to an LED strip.

Figure 19B:
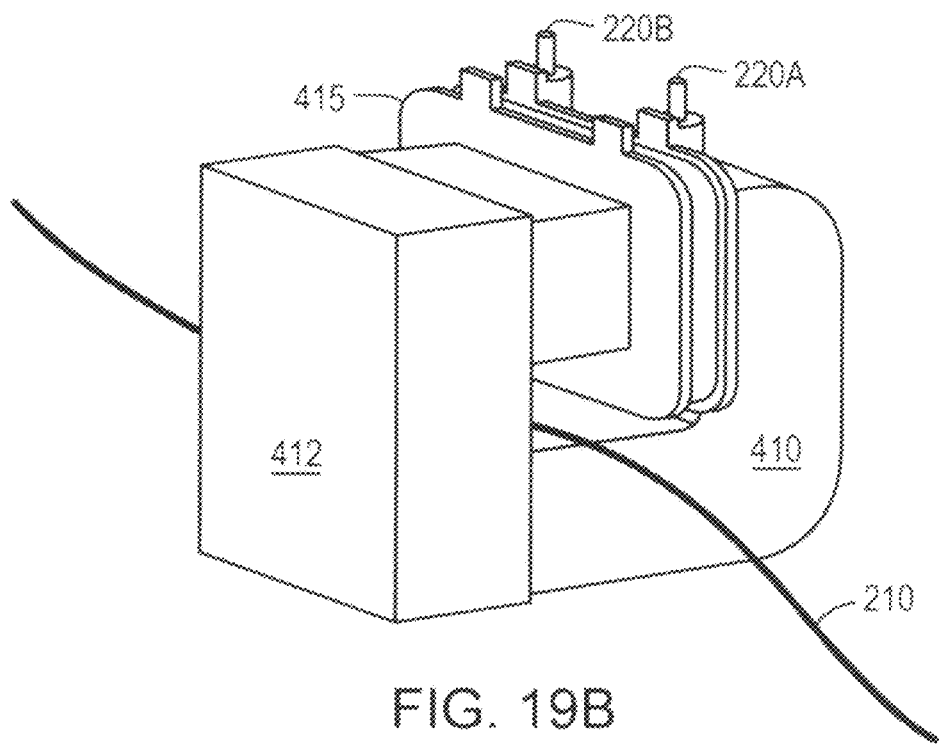
FIGS. 19B and 19C illustrate schematically a magnetic core and locations of secondary wires inside the coupling box shown in FIGS. 19 and 19A.
Figure 19C:
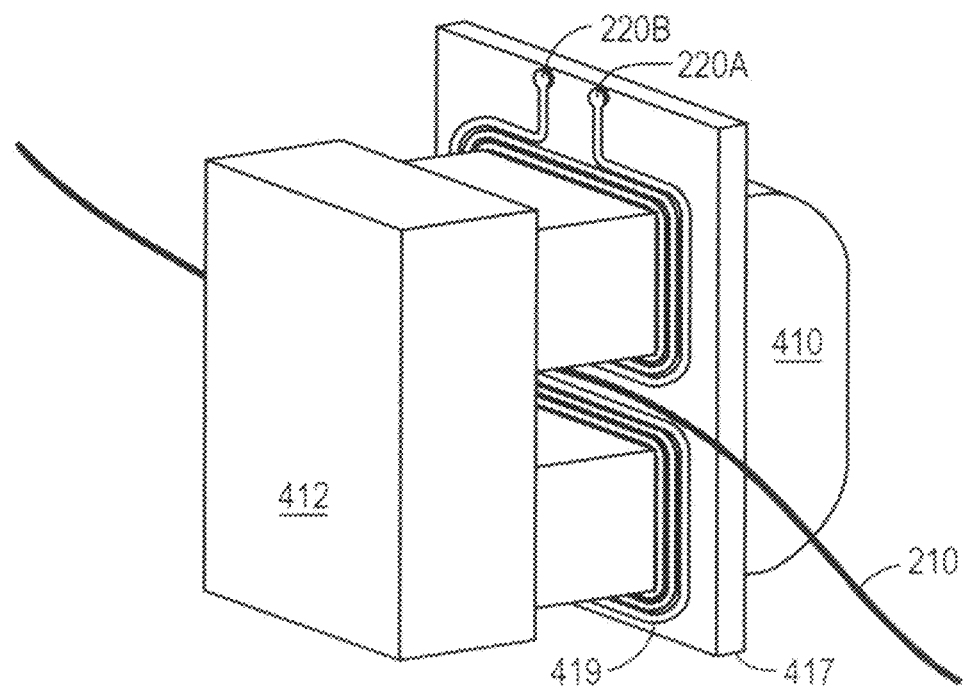
Figure 20C:
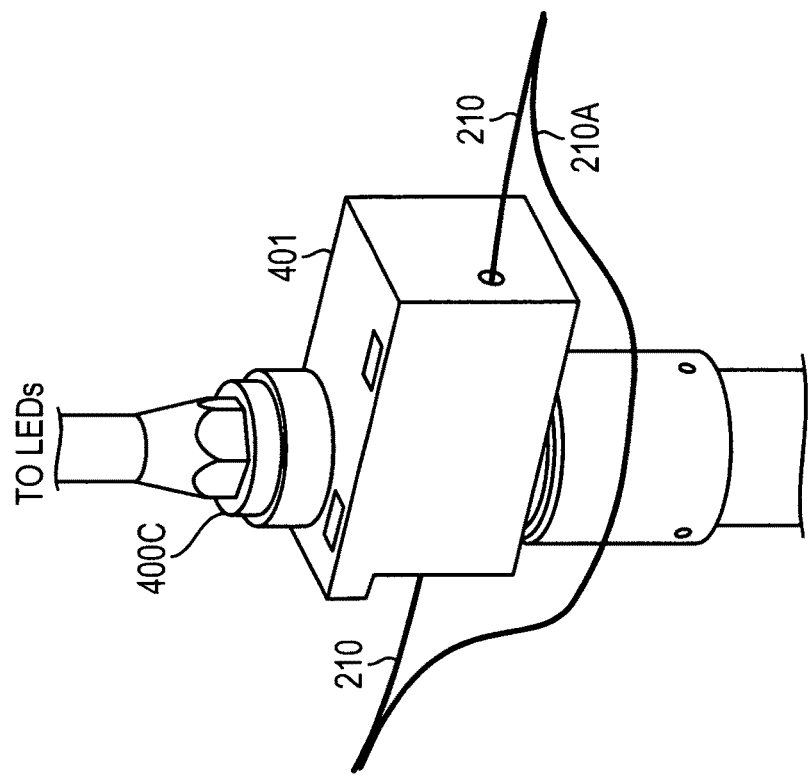
Figure 20B:
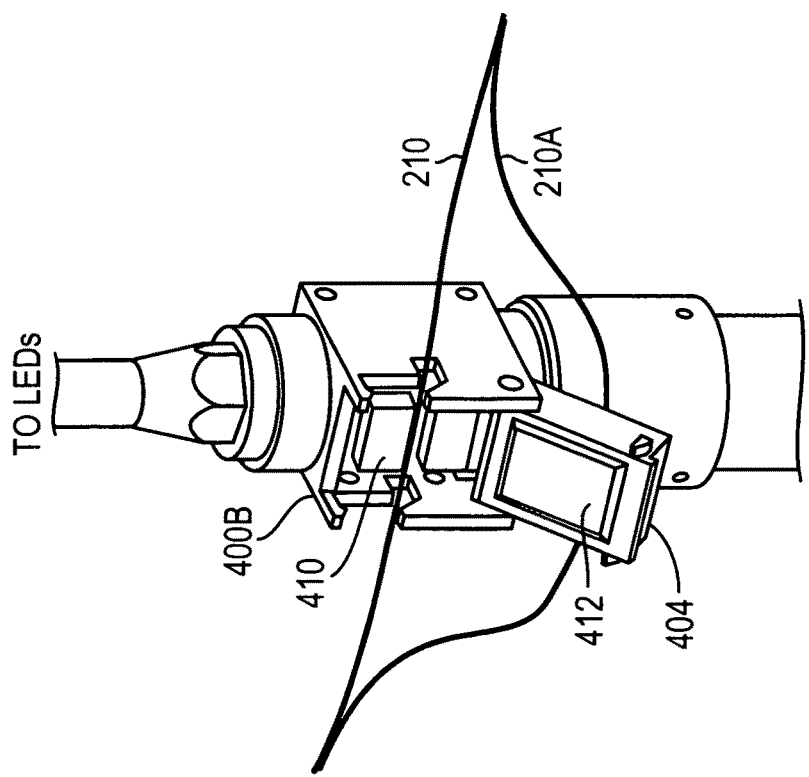

FIGS. 19B and 19C illustrate schematically a magnetic core and locations of secondary wires inside the coupling box shown in FIGS. 19 and 19A. The magnetic core includes split core elements 410 and 412. As shown in FIG. 19B, split core element 410 is designed to receive a bobbin 415 for the secondary wires. As shown in FIG. 19C, split core element 410 is designed to receive a PCB board 419 for the secondary wires split core element 410 is designed to receive a PCB board 419 with a copper traces 419 fabricated on PCB 417 to provide the secondary wires.

FIGS. 20, 20A, 20B and 20C illustrate different embodiments of the coupling boxes designed for the illumination system shown in FIG. 8, 9 or 11, and used for the landscaping. In this design, rod 428 is coupled via connector 425 to box 420 receiving the electric wires. Coupling ring 430 is connected to the illumination fixture 432 for purposes of illumination using LEDs. FIG. 12C illustrates a dual clip design for a higher output such as driving three LED groups.

Although this system gains some complexity compared to the single-channel structure, several technical challenges are easily resolved. There are several possible problems such as:

(1) The series-resonant stage uses the combined leakage inductance of the transformers as a resonant element. This saves one component.

(2) The transformers can be built very easily in a way that reduces interwinding capacitance and increases the needed leakage inductance, while ensuring full safety isolation.

(3) Resonant topology allows for extremely efficient conversion with reduced EMI emissions.

(4) The resonant topology here functions at fixed frequency; thus, magnetic components can be optimized. Operation is in open loop; thus no added control loops are needed.

(5) Short circuit conditions are not a problem since the input of the resonant converter is a flyback output stage with reduced capacitance, acting as a limited current source.

(6) Dimming, using the bypass method described earlier can still be applied. It can also be applied to any number of channels independently of the others.

(7) The flyback stage is no longer safety-isolated. Thus, the construction can be simplified significantly, while decreasing leakage inductance to further reduce losses.

(8) Capacitor $C_{DC}$ is not strictly necessary, but can be easily added in order to clamp residual leakage energy from the flyback circuit.

Importantly, the proposed circuits eliminate the need for electrolytic capacitors in low-cost LED string drivers. This is done by driving concurrently a boost cell and a flyback cell, while utilizing a single control loop and a single main switching element. An important added feature of this topology is the improved dynamic behavior, which enables a simple and effective dimming technique.

For larger systems, the integration with a series-resonant circuit allows a seamless expansion to multi-channel operation is order to meet regulatory safety requirements.

While the present invention has been described with reference to the above embodiments and the enclosed drawings, the invention is by no means limited to these embodiments. The present invention also includes any modifications or equivalents within the scope of the following claims.

What is claimed is:

1. An illumination system, comprising:
a power supply including a boost converter operating in the discontinuous conduction mode, a flyback converter operating in the critical conduction mode, and a switch coupled to said flyback converter; and
several light emitting diodes receiving power from said power supply.

2. The illumination system of claim 1 wherein said flyback converter includes a flyback inductor, a second switch, and a flyback diode providing flyback-based output regulation and isolation; and wherein said first-mentioned switch and said second switch are connected to turn on at complete discharge of said flyback inductor.

3. The illumination system of claim 2 wherein said flyback converter includes a flyback inductor, a second switch, and a flyback diode providing flyback-based output regulation and isolation; and wherein an output from said flyback converter is coupled to an output rectifier and a filter providing an LED current to said several light emitting diodes.

4. The illumination system of claim 1 wherein all capacitors are non-electrolytic capacitors.

5. The illumination system of claim 1 wherein said flyback converter includes a capacitor operating in open loop and thus said power supply is controlled without receiving a feedback from said capacitor of said flyback converter.

6. The illumination system of claim 1 wherein said flyback converter provides an output being regulated by a feedback loop.

7. The illumination system of claim 6 wherein said flyback converter is regulated by said feedback loop being a voltage feedback.

8. The illumination system of claim 6 wherein said flyback converter is regulated by said feedback loop being a current feedback.

9. The illumination system of claim 6 wherein said boost converter includes a boost inductor and a boost diode, and said flyback converter includes a flyback inductor and a flyback diode, and wherein said flyback converter is regulated by said feedback loop and an error signal sets a peak current of said flyback inductor that automatically also determines a current flowing in said boost inductor.

10. An illumination system, comprising:
a power supply including a boost converter operating in a discontinuous conduction mode, a flyback converter operating in a critical conduction mode, and a switch coupled to said flyback converter, wherein said boost converter includes a boost inductor and a boost diode, and said flyback converter includes a flyback inductor and a flyback diode and said power supply is constructed to turn on said switch as the current flowing in said flyback inductor reaches zero value; and
several light emitting diodes receiving power from said power supply.

11. The illumination system of claim 10 wherein all capacitors are non-electrolytic capacitors.

12. The illumination system of claim 10 wherein an output of said flyback converter is used for regulating said power supply.

13. The illumination system of claim 10 wherein said flyback converter includes a capacitor operating in open loop and thus said power supply is controlled without receiving a feedback from said capacitor of said flyback converter.

14. The illumination system of claim 10 wherein said flyback converter provides an output being regulated by a feedback loop.

15. The illumination system of claim 14 wherein said flyback converter is regulated by said feedback loop being a voltage feedback.

16. The illumination system of claim 14 wherein said flyback converter is regulated by said feedback loop being a current feedback.

17. The illumination system of claim 14 wherein said flyback converter is regulated by said feedback loop and an error signal sets a peak current of said flyback inductor that automatically also determines a current flowing in said boost inductor.

18. An illumination method, comprising the steps of:
   providing a power supply including a boost converter, a flyback converter, and a switch coupled to said flyback converter;
   operating said boost converter in the discontinuous conduction mode, and operating said flyback converter in the critical conduction mode; and
   delivering current to several light emitting diodes.

19. The illumination method of claim 18 including turning on said switch as a current flowing in a flyback inductor of said flyback converter reaches zero value.

20. The illumination method of claim 18 including regulating said power supply by an output of said flyback converter.

21. The illumination method of claim 18, wherein said flyback converter includes a capacitor operating in open loop and thus controlling said power supply without receiving a feedback from said capacitor of said flyback converter.

22. The illumination method of claim 21 including regulating the output from said flyback converter by utilizing a feedback loop.

23. The illumination method of claim 22 including setting a peak current of said flyback inductor by an error signal sets that automatically also determines a current flowing in a boost inductor of said boost converter.

24. A power supply comprising:
   a boost converter including a boost inductor and a boost diode and operating in the discontinuous conduction mode;
   a flyback converter including a flyback inductor and a flyback diode and operating in the critical conduction mode; and
   a switch coupled to said flyback converter and being connected to turn on at complete discharge of said flyback inductor for said operation in the critical conduction mode.

25. The power supply of claim 24 including a second switch, and wherein said first-mentioned switch and said second switch are connected to turn on as the current flowing in said flyback inductor reaches zero value.

26. The power supply of claim 25 wherein all capacitors are non-electrolytic capacitors.

27. The power supply of claim 25 wherein said flyback converter includes a capacitor operating in open loop and thus said power supply is controlled without receiving a feedback from said capacitor of said flyback converter.

28. The power supply of claim 25 wherein said flyback converter provides an output being regulated by a feedback loop.

29. The power supply of claim 28 wherein said flyback converter is regulated by said feedback loop being a voltage feedback.

30. The power supply of claim 28 wherein said flyback converter is regulated by said feedback loop being a current feedback.

* * * * *